(12) United States Patent
Falconetti et al.

(10) Patent No.: US 11,894,933 B2
(45) Date of Patent: Feb. 6, 2024

(54) DOWNLINK ASSIGNMENT WITH DIFFERENT PROCESSING TIMES

(71) Applicant: Telefonaktiebolaget LM Ericsson (publ), Stockholm (SE)

(72) Inventors: Laetitia Falconetti, Järfälla (SE); Mårten Sundberg, Årstá (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 24 days.

(21) Appl. No.: 16/632,800

(22) PCT Filed: Aug. 7, 2018

(86) PCT No.: PCT/SE2018/050795
§ 371 (c)(1),
(2) Date: Jan. 21, 2020

(87) PCT Pub. No.: WO2019/032019
PCT Pub. Date: Feb. 14, 2019

(65) Prior Publication Data
US 2021/0152295 A1    May 20, 2021

Related U.S. Application Data

(60) Provisional application No. 62/544,627, filed on Aug. 11, 2017.

(51) Int. Cl.
*H04W 72/21* (2023.01)
*H04L 1/1829* (2023.01)
(Continued)

(52) U.S. Cl.
CPC .......... *H04L 1/1854* (2013.01); *H04L 1/1812* (2013.01); *H04L 5/0055* (2013.01);
(Continued)

(58) Field of Classification Search
CPC ... H04L 1/1854; H04L 1/1887; H04L 5/0055; H04W 72/042; H04W 72/0413
See application file for complete search history.

(56) References Cited

U.S. PATENT DOCUMENTS 9,350,581 B2    5/2016 Chen et al.
2012/0269103 A1   10/2012 Papasakellariou et al.
(Continued)

FOREIGN PATENT DOCUMENTS

WO    2011 143636 A1    11/2011
WO    2017 052345 A1     3/2017

OTHER PUBLICATIONS

Intellectual Property India, Office Action in Application No. 202017003762 dated Apr. 6, 2021, 6 pages.
(Continued)

*Primary Examiner* — Bo Hui A Zhu
(74) *Attorney, Agent, or Firm* — BAKER BOTTS L.L.P.

(57) ABSTRACT

According to some embodiments, a network node in a frequency division duplex (FDD) wireless communication network is operable to schedule a first downlink transmission with a first transmission processing time on a first frequency carrier. The scheduling comprises a first downlink assignment index (DAI). The first DAI comprises a first total DAI and a first accumulative DAI. The network node is operable to schedule a second downlink transmission with a second transmission processing time different than the first on a second frequency carrier. The scheduling comprises a second DAI. The second DAI comprises a second total DAI and a second accumulative DAI. The network node expects hybrid automatic repeat request (HARQ) feedback for the first downlink transmission and the second downlink transmission in a single uplink transmission. The network node is
(Continued)

further to transmit the scheduling for the first and second downlink transmission to a wireless device.

17 Claims, 14 Drawing Sheets

(51) Int. Cl.
    *H04L 1/1812*     (2023.01)
    *H04L 5/00*     (2006.01)
    *H04L 5/14*     (2006.01)
    *H04W 72/23*     (2023.01)

(52) U.S. Cl.
    CPC ............... *H04L 5/14* (2013.01); *H04W 72/21* (2023.01); *H04W 72/23* (2023.01)

(56) References Cited

U.S. PATENT DOCUMENTS

| | | |
|---|---|---|
| 2015/0043394 A1 | 2/2015 | Lin et al. |
| 2015/0230242 A1 | 8/2015 | Papasakellariou et al. |
| 2016/0204907 A1 | 7/2016 | Chen et al. |
| 2017/0142695 A1* | 5/2017 | Chen ........................ H04L 5/001 |
| 2018/0278380 A1* | 9/2018 | Kim ........................ H04L 1/1854 |
| 2019/0109677 A1* | 4/2019 | Wang ........................ H04L 5/001 |

OTHER PUBLICATIONS

3GPP TS 36.213 v14.1.0; Technical Specification; 3rd Generation Partnership Project; Technical Specification Group Radio Access Network; Evolved Universal Terrestrial Radio Access (E-UTRA); Physical layer procedures (Release 14)—Dec. 2016.

PCT International Search Report for International application No. PCT/SE2018/050795—dated Nov. 19, 2018.

3GPP TS 36.213 v14.3.0; Section 6.1, Physical non-synchronized random access procedure—dated Jun. 2017.

PCT Written Opinion of the International Searching Authority for International application No. PCT/SE2018/050795—dated Nov. 19, 2018.

\* cited by examiner

US 11,894,933 B2

DOWNLINK ASSIGNMENT WITH DIFFERENT PROCESSING TIMES

PRIORITY

This nonprovisional application is a U.S. National Stage Filing under 35 U.S.C. § 371 of International Patent Application Serial No. PCT/SE2018/050795 filed Aug. 7, 2018 and entitled "DOWNLINK ASSIGNMENT WITH DIFFERENT PROCESSING TIMES" which claims priority to U.S. Provisional Patent Application No. 62/544,627 filed Aug. 11, 2017 both of which are hereby incorporated by reference in their entirety.

TECHNICAL FIELD

Particular embodiments are directed to wireless communications and, more particularly, to handling of downlink assignment information in a network with different processing times.

INTRODUCTION

The Third Generation Partnership Project (3GPP) Long Term Evolution (LTE) is a standard for high-speed wireless communication for mobile phones and data terminals. The technology background and implementation examples of particular embodiments are described with respect to the LTE system. Particular embodiments, however, apply to any technology (e.g., NR, 5G) relying on acknowledgement of wireless transmissions, such a hybrid automatic repeat request (HARQ).

FIG. 1 illustrates an example radio frame for 1 ms Transmission Time Interval (TTI). In 3GPP LTE systems, data transmissions in both downlink (i.e., from a network node or eNB to a user device or user equipment (UE)) and uplink (from a user device or UE to a network node or eNB) are organized into radio frames of 10 ms. Each radio frame consists of ten equally-sized subframes of length Tsubframe=1 ms.

LTE uses orthogonal frequency division multiplexing (OFDM) in the downlink and discrete Fourier transform (DFT)-spread OFDM (also referred to as single-carrier FDMA) in the uplink. The basic LTE downlink physical resource comprises a time-frequency grid as illustrated in FIG. 2.

FIG. 2 illustrates an example OFDM symbol. The horizontal axis represents time and the other axis represents frequency. Each resource element corresponds to one OFDM subcarrier during one OFDM symbol interval.

Furthermore, resource allocation in LTE is typically described in terms of resource blocks (RBs), where a resource block corresponds to one slot (0.5 ms) in the time domain and twelve contiguous subcarriers in the frequency domain. Resource blocks are numbered in the frequency domain, starting with 0 from one end of the system bandwidth.

FIG. 3 illustrates an LTE uplink resource grid. As illustrated, $N_{RB}^{UL}$ is the number of resource blocks (RBs) contained in the uplink system bandwidth, $N_{sc}^{RB}$ is the number subcarriers in each RB (typically $N_{sc}^{RB}=12$), $N_{symb}^{UL}$ is the number of SC-FDMA symbols in each slot. $N_{symb}^{UL}=7$ for normal cyclic prefix (CP) and $N_{symb}^{UL}=6$ for extended CP. A subcarrier and a SC-FDMA symbol forms an uplink resource element (RE).

Downlink transmissions are dynamically scheduled. In each subframe a base station transmits control information about which terminals data is transmitted to and upon which resource blocks the data is transmitted in the current downlink subframe. The control signaling is typically transmitted in the first 1, 2, 3 or 4 OFDM symbols in each subframe and the number n=1, 2, 3 or 4 is known as the Control Format Indicator (CFI).

FIG. 4 illustrates an example downlink subframe. The subframe includes reference symbols and control signaling. In the illustrated example, the control region includes 3 OFDM symbols (i.e., CFI=3).

Transmissions in the uplink (from a UE to an eNB) are, as in the downlink, also dynamically scheduled through the downlink control channel. When a UE receives uplink grant in subframe n, it transmits data in the uplink at subframe n+k, where k=4 for frequency division duplex (FDD) system and k varies for time division duplex (TDD) systems.

LTE supports a number of physical channels for data transmissions. A downlink or an uplink physical channel corresponds to a set of resource elements carrying information originating from higher layers. A downlink or an uplink physical signal is used by the physical layer but does not carry information originating from higher layers. Some of the downlink physical channels and signals supported in LTE are: (a) Physical Downlink Shared Channel (PDSCH); (b) Physical Downlink Control Channel (PDCCH); (c) Enhanced Physical Downlink Control Channel (EPDCCH); and reference signals such as (d) Cell Specific Reference Signals (CRS); (e) DeModulation Reference Signal (DMRS) for PDSCH; and (f) Channel State Information Reference Signals (CSI-RS).

PDSCH is used mainly for carrying user traffic data and higher layer messages in the downlink. PDSCH is transmitted in a downlink subframe outside of the control region as shown in FIG. 4. Both PDCCH and EPDCCH are used to carry Downlink Control Information (DCI) such as physical resource block (PRB) allocation, modulation level and coding scheme (MCS), precoder used at the transmitter, etc. PDCCH is transmitted in the first one to four OFDM symbols in a downlink subframe (i.e., the control region) while EPDCCH is transmitted in the same region as PDSCH.

Some of the uplink physical channels and signals supported in LTE are: (a) Physical Uplink Shared Channel (PUSCH); (b) Physical Uplink Control Channel (PUCCH); (c) DeModulation Reference Signal (DMRS) for PUSCH; and (d) DeModulation Reference Signal (DMRS) for PUCCH. The PUSCH is used to carry uplink data or/and uplink control information from the UE to the eNodeB. The PUCCH is used to carry uplink control information from the UE to the eNodeB.

LTE Release 10 includes carrier aggregation (CA). A UE configured with carrier aggregation can receive or transmit data on different frequency carriers at the same time (i.e., in the same subframe). This increases the UE throughput. For example, a UE is configured with downlink carrier aggregation of carrier 0 that is 10 MHz bandwidth and carrier 1 that has 20 MHz bandwidth. The UE can receive in the same subframe a downlink assignment for receiving a 10 MHz PDSCH on carrier 0 and a downlink assignment for receiving a 20 MHz PDSCH on carrier 1. A carrier may also be referred to as a component carrier. The term serving cell may to refer to a carrier from a UE perspective.

One goal of LTE is latency reduction. Packet data latency is one of the performance metrics that vendors, operators and end-users (via speed test applications) regularly measure. Latency measurements are performed in all phases of a radio access network system lifetime, such as when verifying a new software release or system component, when deploying a system, and when the system is in commercial operation.

One performance metric that guided the design of LTE is to achieve shorter latency than previous generations of 3GPP radio access technologies (RATs). LTE is recognized by end-users as a system that provides faster access to internet and lower data latencies than previous generations of mobile radio technologies.

Packet data latency is important not only for the perceived responsiveness of the system; but it also indirectly influences the throughput of the system. HTTP/TCP is the dominating application and transport layer protocol suite used on the internet today.

According to HTTP Archive (available at httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Thus, improved latency can improve the average throughput for this type of TCP based data transaction.

Radio resource efficiency may also be positively impacted by latency reductions. Lower packet data latency can increase the number of transmissions possible within a certain delay bound. Thus, higher Block Error Rate (BLER) targets may be used for the data transmissions, freeing up radio resources and potentially improving the capacity of the system.

One approach to latency reduction is a reduction of transport time of data and control signaling by adjusting the length of a transmission time interval (TTI). Reducing the length of a TTI and maintaining the bandwidth may reduce processing time at the transmitter and the receiver nodes because of less data to process within the TTI.

In LTE Release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols (os) in the case of extended cyclic prefix. Other LTE releases, such as LTE release 15 may specify transmissions with shorter TTIs, such as a slot or a few symbols.

A sTTI may have any duration in time, may comprise resources on any number of OFDM or SC-FDMA symbols, and may start at any symbol position within the overall frame. Currently LTE allows the sTTIs to start at fixed positions with durations of either 2, 3 or 7 symbols. Furthermore, the sTTI is not allowed to cross slot or subframe boundaries. The duration of 2 or 3 symbols is referred to as a subslot transmission while the 7 symbol duration is referred to as a slot transmission. An example is illustrated in FIG. 5.

FIG. 5 is an example of a ⅔-symbol sTTI configuration within an uplink subframe. The duration of the uplink short TTI is 0.5 ms (i.e., seven SC FDMA symbols for normal cyclic prefix). Also, a combined length of 2 or 3 symbols are shown for the sTTI. Here, the "R" in the figures indicates the DMRS symbols, and "D" indicates the data symbols. Other configurations are not excluded. FIG. 5 illustrates one example of differences in sTTI lengths.

The allowed sTTI combinations for downlink and uplink in LTE are listed in Table 1.

TABLE 1

| Allowed {DL, UL} sTTI combinations | |
|---|---|
| DL | UL |
| Slot | Slot |
| Subslot | Slot |
| Subslot | Subslot |

Some transmissions may include joint HARQ feedback transmission for multiple downlink transmissions of different TTI lengths and/or different processing time. A first example includes joint HARQ feedback transmission for 1 ms TTI downlink transmissions and sTTI downlink transmissions. A particular example is illustrated in FIG. 6.

FIG. 6 illustrates an example of a downlink and uplink sTTI pattern. A LTE subframe composed of 14 OFDM or SC-FDMA symbols is divided into 6 sTTIs. Some of the sTTIs are of length 2 OFDM/SC-FDMA symbols, and some of them are of length 3 OFDM/SC-FDMA symbols.

In LTE, the UE should send hybrid automatic repeat request (HARQ) feedback for each downlink transmission. The uplink transmission containing the downlink HARQ feedback is specified to take place after a specified time duration. As an example, for LTE and 2 os sTTI, the processing time is assumed to be 3 sTTI periods (also known as N+4 timing). A downlink transmission carried out in downlink sTTI N will receive feedback in the uplink control transmission in sTTI N+4. FIG. 6 illustrates downlink data transmission and downlink HARQ feedback transmission for N+4 timing.

A similar situation exists with the uplink grant and its associated uplink data transmission. If an uplink grant is sent in (s)TTI N, the corresponding granted uplink data transmission will be sent after a 3 (s)TTI processing period, assuming N+4 timing.

Because a single UE can be allocated both a shorter TTI and a longer TTI, there are cases where a collision will occur on the uplink. A longer TTI transmission overlaps with a shorter TTI transmission. An example is illustrated in FIG. 7.

FIG. 7 illustrates uplink collisions of different TTI lengths and joint HARQ feedback transmission for 1 ms TTI downlink transmissions and sTTI downlink transmissions. A 2 os TTI uplink grant schedules a 2 os TTI uplink data transmission in the same subframe of an originally scheduled 1 ms TTI uplink data transmission.

From a UE perspective, it is problematic to transmit both the shorter and longer TTI when they are overlapping because the transmit power will change over the transmission of the longer TTI resulting in radio frequency related problems at the UE (phase and power variations). To solve this, one of the transmissions may be dropped.

Because sTTI transmissions should be prioritized, the 1 ms TTI is likely to be dropped. If the 1 ms TTI uplink channels that are dropped carry HARQ feedback (e.g., in case of PUCCH/sPUCCH collision or sPUSCH with UCI and PUCCH collision), the HARQ feedback corresponding to the 1 ms TTI should be mapped and transmitted over the sTTI channel. The sTTI channel may also contain HARQ feedback for a sTTI transmission. Thus, the uplink sTTI channel may carry information related to both 1 ms TTI and sTTI downlink transmissions.

Some transmissions may include joint HARQ feedback transmission for 1 ms TTI downlink transmissions of different processing times. For a UE configured with carrier aggregation, if the shortened processing time is configured independently for each component carrier, a similar situation as described above for sTTI operation could happen when the UE operates with multiple reaction times (i.e., the UE needs to feed back Ack/Nack status for two different reaction times in the same uplink control channel, or uplink control information). That is, out of N reported A/N bits in the uplink control information, X could represent status from a first reaction time, and N−x could represent the status for a second reaction time, i.e. that the blocks, which received status are fed back have been transmitted in different times on the downlink. An example is illustrated in FIG. 8.

FIG. 8 illustrates uplink collisions of 1 ms TTI transmissions of different processing times and joint transmission of their HARQ feedback. A 1 ms TTI transmission on carrier 0 has a processing time of n+3 (i.e., 3 ms) while the 1 ms TTI transmission on carrier 1 has a processing time of n+4 (i.e., 4 ms). A single uplink carrier may carry the HARQ feedback for both downlink carriers. Consequently, two subframes scheduled at different times on carrier 0 and carrier 1 may expect HARQ feedback in the same uplink subframe on the same uplink carrier. Therefore, their HARQ feedback has to be jointly reported.

Some transmissions may include joint HARQ feedback transmission for multiple sTTI downlink transmissions. A similar problem occurs when the TTI length in uplink and downlink is not symmetric (see Table 1). For example, there may be a ⅔ os TTI length in downlink, also called a subslot downlink transmission, while the TTI length in uplink is 7 os, also called a slot transmission. An example is illustrated in FIG. 9.

FIG. 9 illustrates joint transmission of HARQ feedback for multiple downlink TTI transmissions of shorter length than the uplink TTI length. In that case, since there are more downlink sTTI per subframe (i.e., 6) than there are uplink sTTI per subframe (i.e., 2), HARQ feedback for multiple downlink sTTI data transmissions (i.e., 3) are fed back in the same uplink sTTI transmission.

Uplink control information (UCI) includes HARQ feedback (i.e., feedback from the receiving node on the state of the received transport blocks, Ack/Nack), and possibly channel state information. The UCI may be carried in a control channel dedicated for control, the Physical Uplink Control Channel (PUCCH).

Alternatively, the UCI may be carried by the Physical Uplink Shared Data Channel (PUSCH) multiplexed with the data. A UE may be granted uplink transmission at the same time it is scheduled to transmit the UCI.

If the UE does not support, or is not configured with simultaneous transmission of PUSCH and PUCCH, the UCI that could be transmitted on PUCCH is instead multiplexed with the data on PUSCH. PUSCH may also be scheduled by an uplink grant to only carry UCI. The same principle of PUSCH and PUCCH applies irrespective of the transmission time interval (TTI) of the channel, i.e. also using shortened TTI, sTTI, the UCI of sPUCCH can be carried by sPUSCH.

Legacy TTI includes a Downlink Assignment Index (DAI) as part of DCI and it is transmitted from eNB to UE through downlink control channel. It indicates the number of downlink HARQ-ACK reports that are to be transmitted on uplink. The purpose is to increase reliability for the communication between the eNB and the UE regarding which of the scheduled transport blocks were received by the UE. To identify that a transport block has been scheduled, the UE decodes the control channel over which the assignment is carried (e.g., in LTE the Physical Downlink Control Channel (PDCCH)). If the UE is not able to decode the PDCCH, however, the UE will not know that the network has sched-uled it, and thus the reporting of the received states of the blocks (Ack or Nack) will not be aligned with what the network expects.

For FDD, in Release 13, a higher layer parameter is introduced to turn on the DAI functionality. For example, if the high layer parameter cdebooksizeDetermination-r13=dai, the value of the counter Downlink Assignment Indicator (DAI) denotes the accumulative number of serving cell(s) with PDSCH transmission(s), and the value of the total DAI denotes the total number of serving cell(s) with PDSCH transmission(s). Table 2 (reproduced from 3GPP TS 36.213, v14.1.0) defines the value of counter DAI and total DAI for FDD HARQ-ACK.

TABLE 2

Value of counter DAI and total DAI

| DAI MSB, LSB | $V_{C\text{-}DAI, c}{}^{DL}$ or $V_{T\text{-}DAI}{}^{DL}$ | Number of serving cells with PDSCH transmission associated with PDCCH/EPDCCH and serving cell with PDCCH/EPDCCH indicating DL SPS release |
|---|---|---|
| 0, 0 | 1 | 1 or 5 or 9 or 13 or 17 or 21 or 25 or 29 |
| 0, 1 | 2 | 2 or 6 or 10 or 14 or 18 or 22 or 26 or 30 |
| 1, 0 | 3 | 3 or 7 or 11 or 15 or 19 or 23 or 27 or 31 |
| 1, 1 | 4 | 0 or 4 or 8 or 12 or 16 or 20 or 24 or 28 or 32 |

TDD only uses one DAI parameter, but it is carried on both downlink DCI and uplink DCI. Table 3 (reproduced from 3GPP TS 36.213, v14.1.0) shows the design of the DAI value.

TABLE 3

Value of Downlink Assignment Index

| DAI MSB, LSB | $V_{DAI}{}^{UL}$ or $V_{DAI}{}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 |

In general, with the information carried by DA, even if a UE misses a few downlink assignments, the UE is still able to determine the total number of expected HARQ bits, and thus transmit the correct number of HARQ bits to the eNB such that the eNB will not be confused by the mismatch between the expected and the real transmitted number of HARQ bits, which in turn ensures downlink performance. In some cases, HARQ bundling is applied and the UE uses DAI to identify a missed downlink assignment and report a NACK if that is the case.

A problem with existing solutions is that a UE has to send in the same uplink transmission HARQ feedback for downlink transmissions that occur at different times. This problem occurs for FDD.

If the UE misses downlink assignments on one of the scheduled carriers and on one of the scheduled subframes, there will be a mismatch between the total number of HARQ bits expected at the eNB and the number actually transmitted by the UE. An error in detecting HARQ bits occurs and negatively impacts downlink performance. Thus, when channel collision happens between TTIs of different processing times or between TTI and sTTI, a good knowledge of the total number of HARQ bits expected by eNB is important to the downlink performance.

For legacy TTI, with the help of a DAI counter and/or a DAI total, a UE will have relatively good knowledge of the total expected number of HARQ bits. But the legacy DAI does not cover the case of FDD operation with different processing times and downlink transmissions occurring in different subframes to be fed back in the same uplink subframe. Because there is no DAI functionality for this case, if one or more downlink assignments are missed, the UE will not report the exact number of HARQ bits that are expected by eNB.

SUMMARY

The embodiments described herein include a transmitter and receiver that have the same understanding on how many transport blocks and with what processing time have been sent, minimizing the risk that a missed detection of a transport block by the receiver results in the feedback transmitted being misinterpreted. Particular embodiments minimize this risk.

According to some embodiments, a network node in a frequency division duplex (FDD) wireless communication network is operable to schedule a first downlink transmission with a first transmission processing time on a first frequency carrier. The scheduling comprises a first downlink assignment index (DAI). The first DAI comprises a first total DAI and a first accumulative DAI. The network node is operable to schedule a second downlink transmission with a second transmission processing time different than the first on a second frequency carrier. The scheduling comprises a second DAI. The second DAI comprises a second total DAI and a second accumulative DAI. The network node expects hybrid automatic repeat request (HARQ) feedback for the first downlink transmission and the second downlink transmission in a single uplink transmission. The network node is further to transmit the scheduling for the first and second downlink transmission to a wireless device.

According to some embodiments, a method for use in a network node of a frequency FDD wireless communication network comprises scheduling a first downlink transmission with a first transmission processing time on a first frequency carrier. The scheduling comprises a first DAI. The first DAI comprises a first total DAI and a first accumulative DAI. The method further comprises scheduling a second downlink transmission with a second transmission processing time different than the first processing time on a second frequency carrier. The scheduling comprises a second DAI. The second DAI comprises a second total DAI and a second accumulative DAI. The network node expects HARQ feedback for the first downlink transmission and the second downlink transmission in a single uplink transmission. The method further comprises transmitting the scheduling for the first and second downlink transmission to a wireless device.

In particular embodiments, the first downlink transmission is scheduled and transmitted to the wireless device at a first transmission time and the second downlink transmission is scheduled and transmitted to the wireless device at a second transmission time later than the first transmission time.

In particular embodiments, the first and second total DAI may be set to a same value and refer to a total number of downlink transmissions with HARQ feedback expected in the single uplink transmission. The first accumulative DAI includes a number of downlink transmissions with HARQ feedback expected in the single uplink transmission that are scheduled at the first transmission time, and the second accumulative DAI includes a number of downlink transmissions with HARQ feedback expected in the single uplink transmission that are scheduled at the first transmission time and the second transmission time.

In particular embodiments, the first downlink transmission is associated with a first group of frequency carriers that share the same transmission processing time. The first total DAI is set to a total number of downlink transmissions with HARQ feedback expected in the single uplink transmission for the first group of frequency carriers. The second downlink transmission is associated with a second group of frequency carriers that share the same transmission processing time. The second total DAI is set to a total number of downlink transmissions with HARQ feedback expected in the single uplink transmission for the second group of frequency carriers. The first accumulative DAI may be set to a number of downlink transmissions with HARQ feedback expected in the single uplink transmission that are previously scheduled at the first transmission time for the first group of frequency carriers, and the second accumulative DAI includes a number of downlink transmissions with HARQ feedback expected in the single uplink transmission that are previously scheduled at the second transmission time for the second group of frequency carriers.

In particular embodiments, the first transmission processing time is longer than the second transmission processing time. The first total DAI is set to a total number of downlink transmissions with HARQ feedback expected in the single uplink transmission that are scheduled at the first transmission time. The first accumulative DAI includes a number of downlink transmissions with HARQ feedback expected in the single uplink transmission that are previously scheduled at the first transmission time. The second total DAI is set to a total number of downlink transmissions with HARQ feedback expected in the single uplink transmission that are scheduled at the first transmission time and the second transmission time. The second accumulative DAI includes a number of downlink transmissions with HARQ feedback expected in the single uplink transmission that are previously scheduled at the first transmission time and the second transmission time.

According to some embodiments, a network node is capable of operating in a FDD wireless communication network. The network node comprises processing circuitry operable to schedule a first downlink transmission with a first transmission duration on a first frequency carrier. The scheduling comprises a first DAI. The first DAI comprises a first total DAI and a first accumulative DAI. The network node is further operable to schedule a second downlink transmission with a second transmission duration on a second frequency carrier. The scheduling comprises a second DAI. The second DAI comprises a second total DAI and a second accumulative DAI. The network node expects HARQ feedback for the first downlink transmission and the second downlink transmission in a single uplink transmission on a third frequency carrier. The uplink transmission has a third transmission duration different than at least one of the first and second transmission duration. The network node is further operable to transmit the scheduling for the first and second downlink transmission to a wireless device.

According to some embodiments, a method for use in a network node of a FDD wireless communication network comprises scheduling a first downlink transmission with a first transmission duration on a first frequency carrier. The scheduling comprises a first DAI. The first DAI comprises a first total DAI and a first accumulative DAI. The method further comprises scheduling a second downlink transmission with a second transmission duration on a second frequency carrier. The scheduling comprises a second DAI. The second DAI comprising a second total DAI and a second accumulative DAI. The network node expects HARQ feedback for the first downlink transmission and the second downlink transmission in a single uplink transmission on a third frequency carrier. The uplink transmission has a third transmission duration different than at least one of the first and second transmission duration. The method further comprises transmitting the scheduling for the first and second downlink transmission to a wireless device.

In particular embodiments, the first downlink transmission is scheduled and transmitted to the wireless device at a first transmission time and the second downlink transmission is scheduled and transmitted to the wireless device at a second transmission time later than the first transmission time.

In particular embodiments, the first transmission duration is the same as the second transmission duration; the first frequency carrier is the same as the second frequency carrier; and the first transmission duration and the second transmission duration are shorter than the third transmission duration. The first total DAI may be set to a total number of downlink transmissions with HARQ feedback expected in the single uplink transmission that are scheduled at the first transmission time. The first accumulative DAI may be set to a number of downlink transmissions with HARQ feedback expected in the single uplink transmission that are previously scheduled at the first transmission time. The second total DAI may be set to a total number of downlink transmissions with HARQ feedback expected in the single uplink transmission that are scheduled at the first transmission time and the second transmission time. The second accumulative DAI may be set to a number of downlink transmissions with HARQ feedback expected in the single uplink transmission that are previously scheduled at the first transmission time and the second transmission time.

According to some embodiments, a method for use in a user equipment of a FDD wireless communication network comprises receiving scheduling for a first downlink transmission with a first transmission processing time on a first frequency carrier. The scheduling comprises a first DAI. The first DAI comprises a first total DAI and a first accumulative DAI. The method further comprises receiving scheduling for a second downlink transmission with a second transmission processing time different than the first processing time on a second frequency carrier. The scheduling comprises a second DAI. The second DAI comprises a second total DAI and a second accumulative DAI. The method further comprises receiving the first and second downlink transmissions and transmitting HARQ feedback for the first downlink transmission and the second downlink transmission in a single uplink transmission.

According to some embodiments, a user equipment is capable of operating in a FDD wireless communication network. The user equipment comprises processing circuitry operable to receive scheduling for a first downlink transmission with a first transmission processing time on a first frequency carrier. The scheduling comprises a first DAI. The first DAI comprises a first total DAI and a first accumulative DAI. The user equipment is further operable to receive scheduling for a second downlink transmission with a second transmission processing time different than the first processing time on a second frequency carrier. The scheduling comprises a second DAI. The second DAI comprises a second total DAI and a second accumulative DAI. The user equipment is further operable to receive the first and second downlink transmissions and transmit HARQ feedback for the first downlink transmission and the second downlink transmission in a single uplink transmission.

In particular embodiments, the first downlink transmission is scheduled and received by the user equipment at a first transmission time and the second downlink transmission is scheduled and received by the user equipment at a second transmission time later than the first transmission time.

In particular embodiments, the first and second total DAI are set to a same value and refer to a total number of downlink transmissions with HARQ feedback expected in the single uplink transmission. The first accumulative DAI includes a number of downlink transmissions with HARQ feedback expected in the single uplink transmission that are scheduled at the first transmission time, and the second accumulative DAI includes a number of downlink transmissions with HARQ feedback expected in the single uplink transmission that are scheduled at the first transmission time and the second transmission time.

In particular embodiments, the first downlink transmission is associated with a first group of frequency carriers that share the same transmission processing time. The first total DAI is set to a total number of downlink transmissions with HARQ feedback expected in the single uplink transmission for the first group of frequency carriers. The second downlink transmission is associated with a second group of frequency carriers that share the same transmission processing time. The second total DAI is set to a total number of downlink transmissions with HARQ feedback expected in the single uplink transmission for the second group of frequency carriers. The first accumulative DAI may be set to a number of downlink transmissions with HARQ feedback expected in the single uplink transmission that are previously scheduled at the first transmission time for the first group of frequency carriers, and the second accumulative DAI includes a number of downlink transmissions with HARQ feedback expected in the single uplink transmission that are previously scheduled at the second transmission time for the second group of frequency carriers.

In particular embodiments, the first transmission processing time is longer than the second transmission processing time. The first total DAI is set to a total number of downlink transmissions with HARQ feedback expected in the single uplink transmission that are scheduled at the first transmission time. The first accumulative DAI includes a number of downlink transmissions with HARQ feedback expected in the single uplink transmission that are previously scheduled at the first transmission time. The second total DAI is set to a total number of downlink transmissions with HARQ feedback expected in the single uplink transmission that are scheduled at the first transmission time and the second transmission time. The second accumulative DAI includes a number of downlink transmissions with HARQ feedback expected in the single uplink transmission that are previously scheduled at the first transmission time and the second transmission time.

According to some embodiments, a user equipment is capable of operating in a FDD wireless communication network. The user equipment comprises processing circuitry operable to receive scheduling for a first downlink transmission with a first transmission duration on a first frequency carrier. The scheduling comprises a first DAI. The first DAI comprises a first total DAI and a first accumulative DAI. The user equipment is further operable to receive scheduling for a second downlink transmission with a second transmission duration on a second frequency carrier. The scheduling comprises a second DAI. The second DAI comprises a second total DAI and a second accumulative DAI. The user equipment is further operable to receive the first and second downlink transmissions and transmit HARQ feedback for the first downlink transmission and the second downlink transmission in a single uplink transmission. The uplink transmission has a third transmission duration different than at least one of the first and second transmission durations.

According to some embodiments, a method for use in a user equipment of a FDD wireless communication network comprise receiving scheduling for a first downlink transmission with a first transmission duration on a first frequency carrier. The scheduling comprises a first DAI. The first DAI comprises a first total DAI and a first accumulative DAI. The method further comprises receiving scheduling for a second downlink transmission with a second transmission duration on a second frequency carrier. The scheduling comprises a second DAI. The second DAI comprises a second total DAI and a second accumulative DAI. The method further comprises receiving the first and second downlink transmissions and transmitting HARQ feedback for the first downlink transmission and the second downlink transmission in a single uplink transmission on a third frequency carrier. The uplink transmission has a third transmission duration different than at least one of the first and second transmission durations.

In particular embodiments, the first downlink transmission is scheduled and received by the user equipment at a first transmission time and the second downlink transmission is scheduled and received by the user equipment at a second transmission time later than the first transmission time.

In particular embodiments, the first transmission duration is the same as the second transmission duration; the first frequency carrier is the same as the second frequency carrier; and the first transmission duration and the second transmission duration are shorter than the third transmission duration. The first total DAI and may be set to a total number of downlink transmissions with HARQ feedback expected in the single uplink transmission that are scheduled at the first transmission time. The first accumulative DAI may be set to a number of downlink transmissions with HARQ feedback expected in the single uplink transmission that are previously scheduled at the first transmission time. The second total DAI may be set to a total number of downlink transmissions with HARQ feedback expected in the single uplink transmission that are scheduled at the first transmission time and the second transmission time. The second accumulative DAI may be set to a number of downlink transmissions with HARQ feedback expected in the single uplink transmission that are previously scheduled at the first transmission time and the second transmission time.

According to some embodiments, a network node is capable of operating in a FDD wireless communication network. The network node comprises a scheduling module and a transmitting module. The scheduling module is operable to schedule a first downlink transmission with a first transmission processing time on a first frequency carrier. The scheduling comprises a first DAI. The first DAI comprises a first total DAI and a first accumulative DAI. The scheduling module is further operable to schedule a second downlink transmission with a second transmission processing time different than the first processing time on a second frequency carrier. The scheduling comprises a second DAI. The second DAI comprises a second total DAI and a second accumulative DAI. The network node expects HARQ feedback for the first downlink transmission and the second downlink transmission in a single uplink transmission. The transmitting module is operable to transmit the scheduling for the first and second downlink transmission to a wireless device.

According to some embodiments, a network node is capable of operating in a FDD wireless communication network. The network node comprises a scheduling module and a transmitting module. The scheduling module is operable to schedule a first downlink transmission with a first transmission duration on a first frequency carrier. The scheduling comprises a first DAI. The first DAI comprises a first total DAI and a first accumulative DAI. The scheduling module is further operable to schedule a second downlink transmission with a second transmission duration on a second frequency carrier. The scheduling comprises a second DAI. The second DAI comprises a second total DAI and a second accumulative DAI. The network node expects HARQ feedback for the first downlink transmission and the second downlink transmission in a single uplink transmission on a third frequency carrier. The uplink transmission has a third transmission duration different than at least one of the first and second transmission duration. The transmitting module is operable to transmit the scheduling for the first and second downlink transmission to a wireless device.

According to some embodiments, a user equipment is capable of operating in a FDD wireless communication network. The user equipment comprises a receiving module and a transmitting module. The receiving module is operable to receive scheduling for a first downlink transmission with a first transmission processing time on a first frequency carrier. The scheduling comprises a first DAI. The first DAI comprises a first total DAI and a first accumulative DAI. The receiving module is further operable to receive scheduling for a second downlink transmission with a second transmission processing time different than the first processing time on a second frequency carrier. The scheduling comprises a second DAI. The second DAI comprises a second total DAI and a second accumulative DAI. The receiving module is further operable to receive the first and second downlink transmissions. The transmitting module is operable to transmit HARQ feedback for the first downlink transmission and the second downlink transmission in a single uplink transmission.

According to some embodiments, a user equipment is capable of operating in a FDD wireless communication network. The user equipment comprises a receiving module and a transmitting module. The receiving module is operable to receive scheduling for a first downlink transmission with a first transmission duration on a first frequency carrier. The scheduling comprises a first DAI. The first DAI comprises a first total DAI and a first accumulative DAI. The receiving module is further operable to receive scheduling for a second downlink transmission with a second transmission duration on a second frequency carrier. The scheduling comprises a second DAI. The second DAI comprises a second total DAI and a second accumulative DAI. The receiving module is further operable to receive the first and second downlink transmissions. The transmitting module is operable to transmit HARQ feedback for the first downlink transmission and the second downlink transmission in a single uplink transmission. The uplink transmission has a third transmission duration different than at least one of the first and second transmission durations.

Also disclosed is a computer program product. The computer program product comprises instructions stored on non-transient computer-readable media which, when executed by a processor, perform the step of scheduling a first downlink transmission with a first transmission processing time on a first frequency carrier. The scheduling comprises a first DAI. The first DAI comprises a first total DAI and a first accumulative DAI. The instructions further perform the step of scheduling a second downlink transmission with a second transmission processing time different than the first processing time on a second frequency carrier. The scheduling comprises a second DAI. The second DAI comprises a second total DAI and a second accumulative DAI. The network node expects HARQ feedback for the first downlink transmission and the second downlink transmission in a single uplink transmission. The instructions further perform the step of transmitting the scheduling for the first and second downlink transmission to a wireless device.

In some embodiments, the instructions perform the step of scheduling a first downlink transmission with a first transmission duration on a first frequency carrier. The scheduling comprises a first DAI. The first DAI comprises a first total DAI and a first accumulative DAI. The instructions further perform the step of scheduling a second downlink transmission with a second transmission duration on a second frequency carrier. The scheduling comprises a second DAI. The second DAI comprising a second total DAI and a second accumulative DAI. The network node expects HARQ feedback for the first downlink transmission and the second downlink transmission in a single uplink transmission on a third frequency carrier. The uplink transmission has a third transmission duration different than at least one of the first and second transmission duration. The instructions further perform the step of transmitting the scheduling for the first and second downlink transmission to a wireless device.

Another computer program product comprises instructions stored on non-transient computer-readable media which, when executed by a processor, perform the step of receiving scheduling for a first downlink transmission with a first transmission processing time on a first frequency carrier. The scheduling comprises a first DAI. The first DAI comprises a first total DAI and a first accumulative DAI. The instructions further perform the step of receiving scheduling for a second downlink transmission with a second transmission processing time different than the first processing time on a second frequency carrier. The scheduling comprises a second DAI. The second DAI comprises a second total DAI and a second accumulative DAI. The instructions further perform the step of receiving the first and second downlink transmissions and transmitting HARQ feedback for the first downlink transmission and the second downlink transmission in a single uplink transmission.

In some embodiments, the instructions perform the step of receiving scheduling for a first downlink transmission with a first transmission duration on a first frequency carrier. The scheduling comprises a first DAI. The first DAI comprises a first total DAI and a first accumulative DAI. The instructions further perform the step of scheduling for a second downlink transmission with a second transmission duration on a second frequency carrier. The scheduling comprises a second DAI. The second DAI comprises a second total DAI and a second accumulative DAI. The instructions further perform the step of receiving the first and second downlink transmissions and transmitting HARQ feedback for the first downlink transmission and the second downlink transmission in a single uplink transmission on a third frequency carrier. The uplink transmission has a third transmission duration different than at least one of the first and second transmission durations.

Particular embodiments may include some, all, or none of the following advantages. For channel collision when PDSCH HARQ with n+4 processing timing and PDSCH HARQ with n+3 processing timing need to be transmitted in the same uplink channel, particular embodiments ensure that the eNB will not be confused by a mismatch between the total expected and actually transmitted HARQ bits, thus reducing negative downlink performance because of channel collision. Some embodiments may include additional or other advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
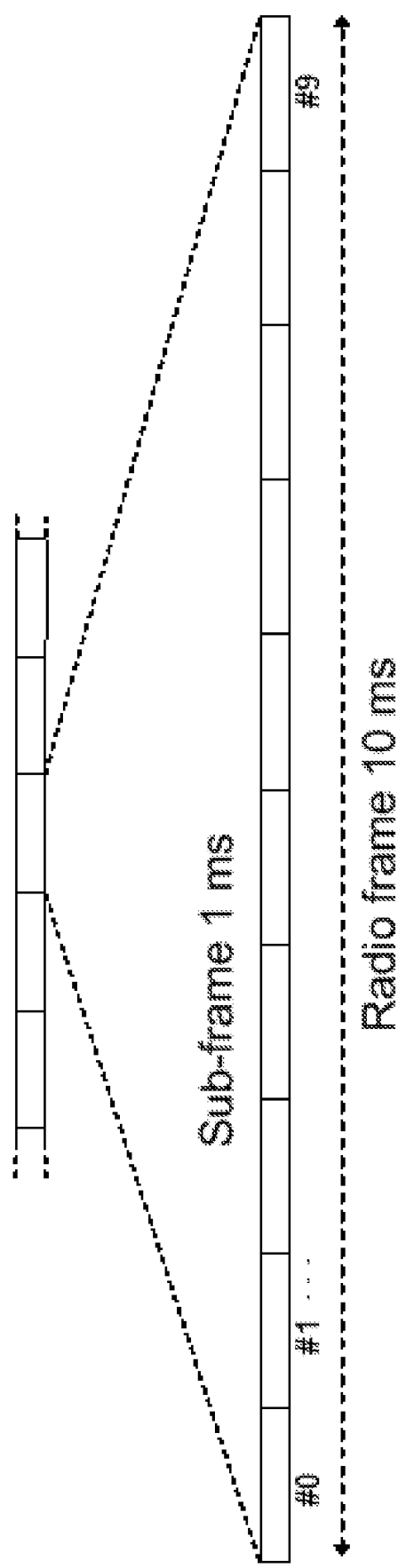
FIG. 1 illustrates an example radio frame for 1 ms Transmission Time Interval (TTI)
Figure 2:
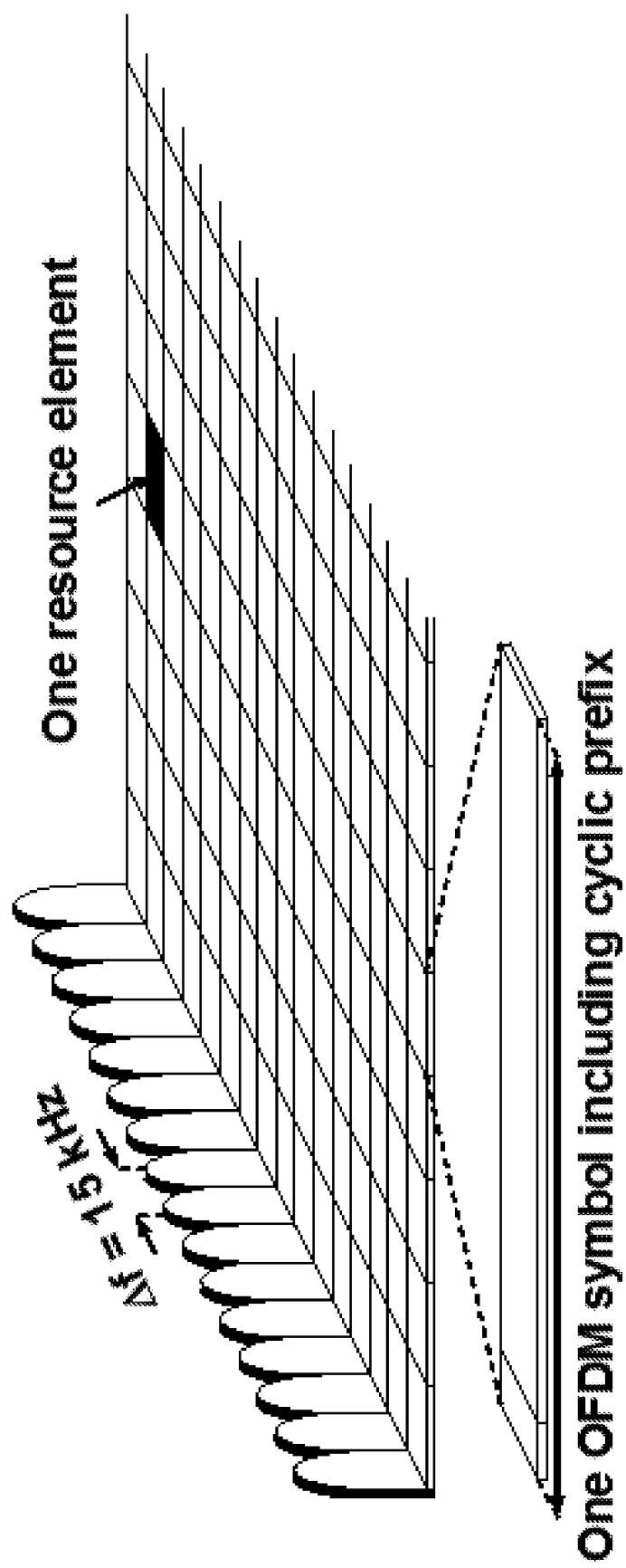
FIG. 2 illustrates an example OFDM symbol.
Figure 3:
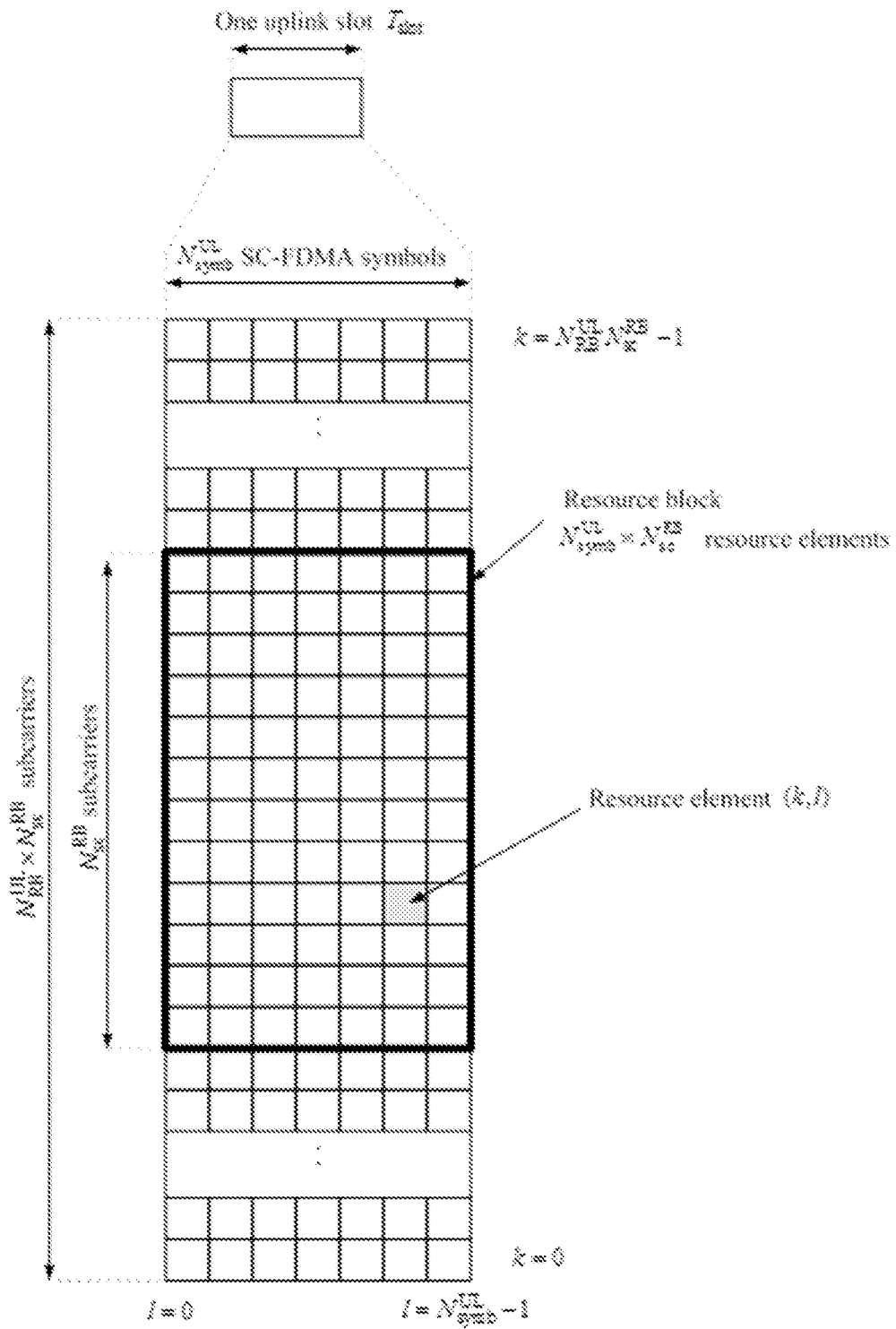
FIG. 3 illustrates an LTE uplink resource grid.
Figure 4:
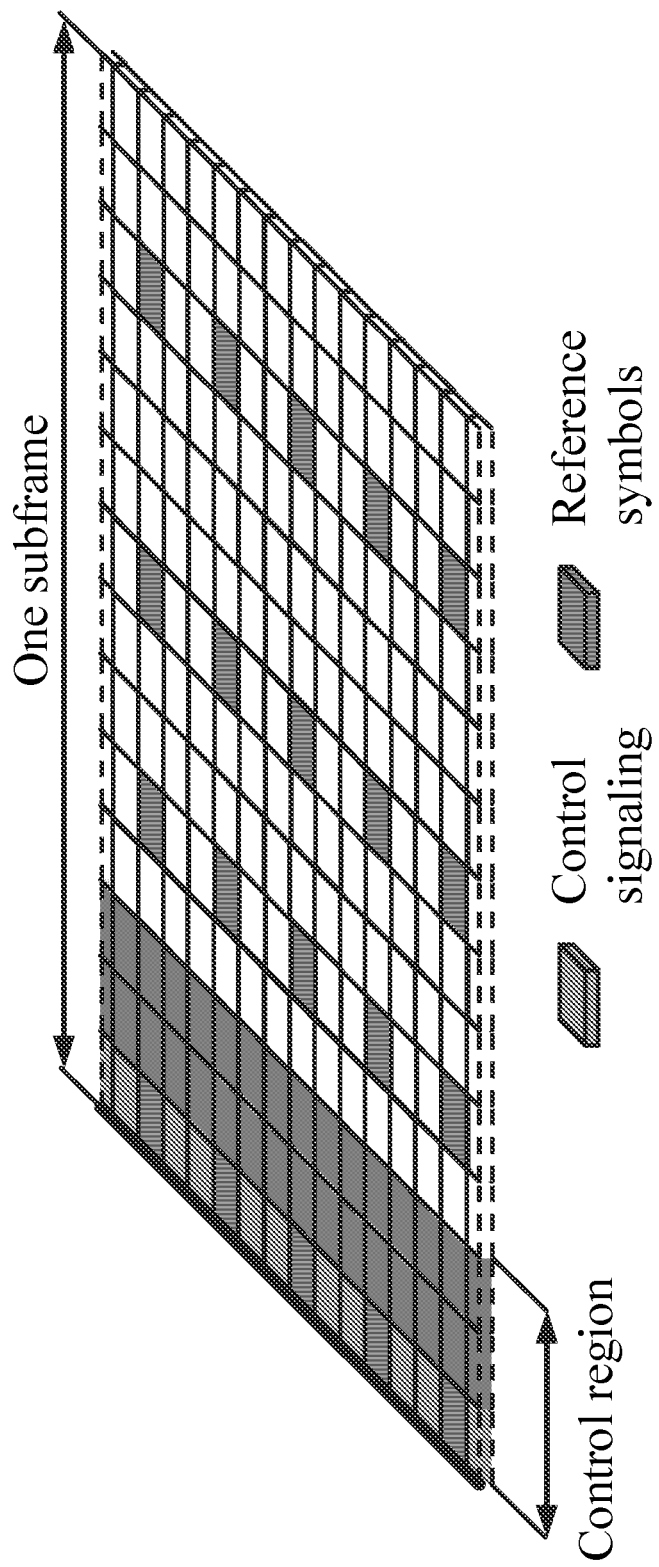
FIG. 4 illustrates an example downlink subframe.
Figure 5:
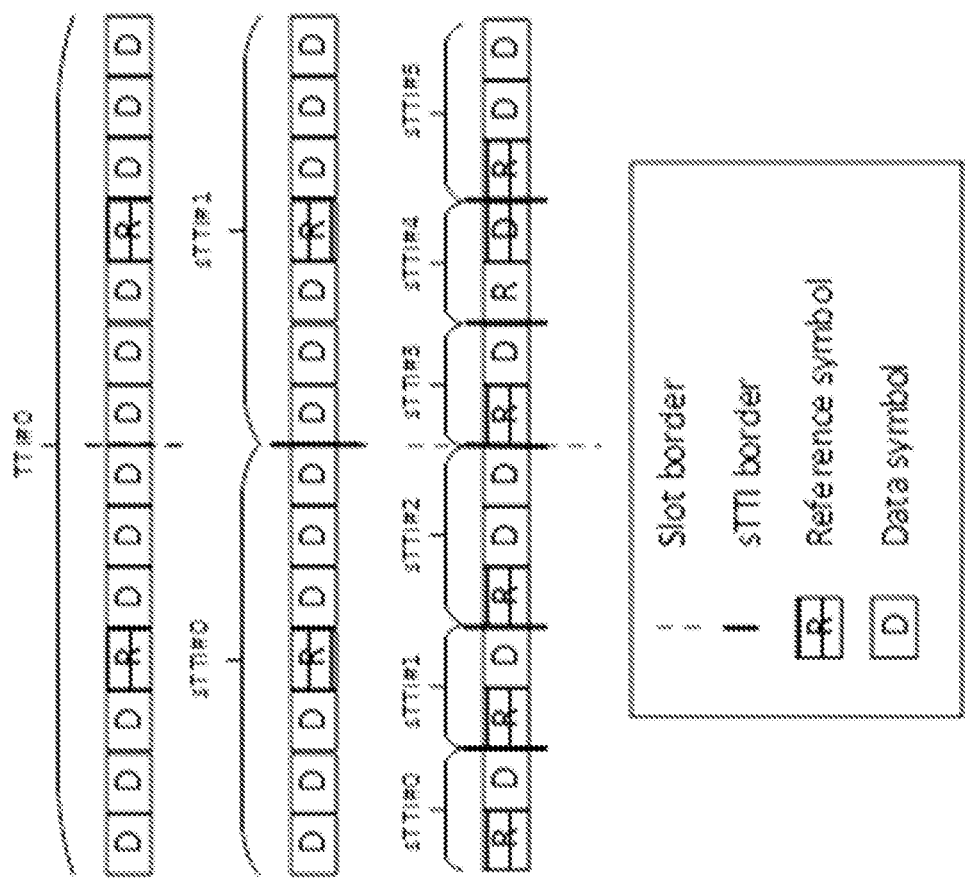
FIG. 5 is an example of a ⅔-symbol sTTI configuration within an uplink subframe.
Figure 6:
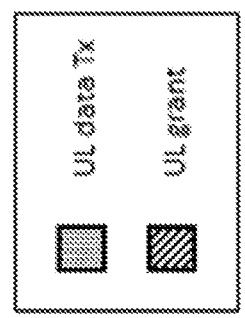
FIG. 6 illustrates an example of a downlink and uplink sTTI pattern.
Figure 6:
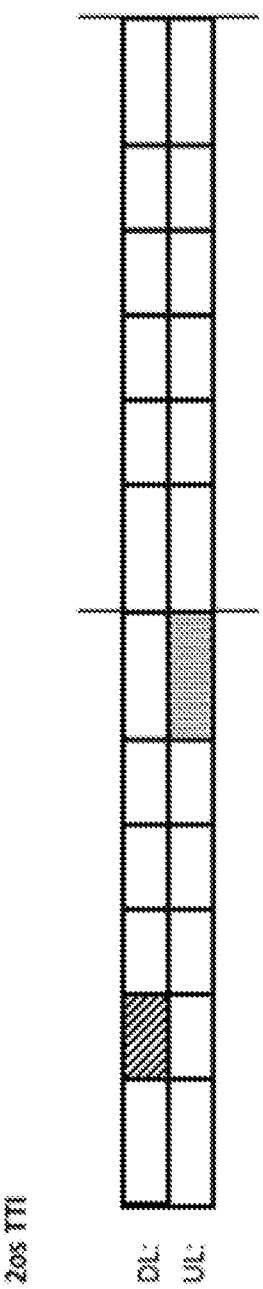
Figure 7:
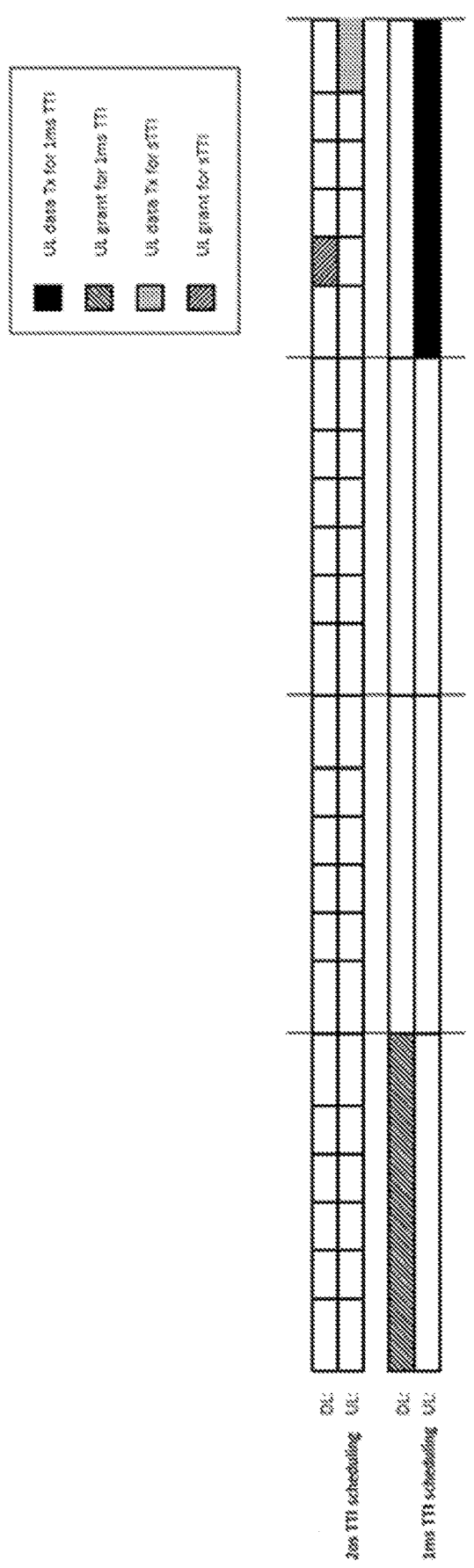
FIG. 7 illustrates uplink collisions of different TTI lengths.
Figure 8:
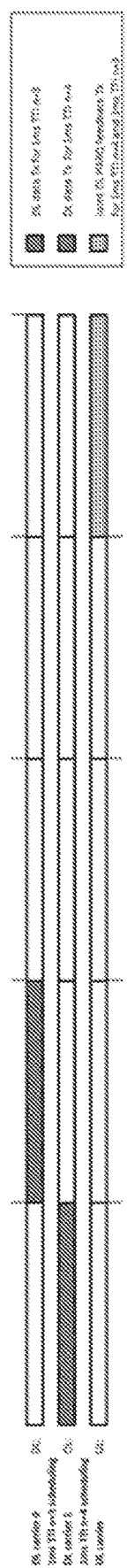
FIG. 8 illustrates uplink collisions of 1 ms TTI transmissions of different processing times and joint transmission of their HARQ feedback.

The Third Generation Partnership Project (3GPP) Long Term Evolution (LTE) is a standard for high-speed wireless communication for mobile phones and data terminals. In LTE Release 8, a transmission time interval (TTI) corresponds to one subframe (SF) of length 1 millisecond. One such 1 ms TTI is constructed by using fourteen orthogonal frequency division multiplexed (OFDM) or single-carrier frequency-division multiple access (SC-FDMA) symbols in the case of normal cyclic prefix and twelve OFDM or SC-FDMA symbols in the case of extended cyclic prefix. Other LTE releases, such as LTE release 15 may specify transmissions with shorter TTIs, such as a slot or a few symbols.

A short TTI (sTTI) may have any duration in time, may comprise resources on any number of OFDM or SC-FDMA symbols, and may start at any symbol position within the overall frame. Currently LTE allows the sTTIs to start at fixed positions with durations of either 2, 3 or 7 symbols. Furthermore, the sTTI is not allowed to cross slot or subframe boundaries. The duration of 2 or 3 symbols is referred to as a subslot transmission while the 7 symbol duration is referred to as a slot transmission.

Some transmissions may include collision of TTI lengths and/or different processing time. In LTE, an uplink grant sent in the downlink will grant an uplink transmission. The uplink transmission is specified to take place after a specified time duration. As an example, for LTE and 2 os sTTI, the processing time is assumed to be 3 sTTI periods (also known as N+4 timing). A similar situation exists with the downlink assignment and its associated hybrid automatic repeat request (HARQ) feedback. If a downlink PDSCH is scheduled in (s)TTI N, the HARQ response will be sent after a 3 (s)TTI processing period, assuming N+4 timing.

Because a single UE can be allocated both a shorter TTI and a longer TTI, there are cases where a collision will occur on the uplink. A longer TTI transmission overlaps with a shorter TTI transmission. From a UE perspective, transmitting both the shorter and longer overlapping TTI is problematic because the transmit power will change over the transmission of the longer TTI resulting in radio frequency related problems at the UE (phase and power variations). To solve this, the longer TTI transmission may be dropped.

If the longer TTI uplink channels that are dropped carry HARQ feedback, the HARQ feedback corresponding to the 1 ms TTI should be mapped and transmitted over the sTTI channel. The sTTI channel may also contain HARQ feedback for a sTTI transmission. Thus, the uplink sTTI channel may carry information related to both 1 ms TTI and sTTI downlink transmissions.

Some transmissions may include collision between 1 ms TTI with different processing times. For a UE configured with carrier aggregation, if the shortened processing time is configured independently for each component carrier, a similar situation as described above for sTTI operation could happen when the UE operates with multiple reaction times. Out of N reported A/N bits in the uplink control information, X could represent status from a first reaction time, and N−x could represent the status for a second reaction time.

Downlink Assignment Index (DAI) is a part of DCI and it is transmitted from eNB to UE through downlink control channel. It presents a value to indicate the number of downlink HARQ-ACK report that is to be transmitted on uplink. The functionality adds extra reliability for the communication between the eNB and the UE regarding which of the scheduled transport blocks were received by the UE. To identify that a transport block has been scheduled, the UE must decode the control channel over which the assignment is carried. If the UE is not able to decode the PDCCH, however, the UE will not know that the network has scheduled it, and thus the reporting of the received states of the transport blocks (Ack or Nack) will not be aligned with what the network expects.

In general, with the information carried by DAI, even if a UE misses a few downlink assignments, the UE is still able to determine the total number of expected HARQ bits, and thus transmit the correct number of HARQ bits to the eNB such that the eNB will not be confused by the mismatch between the expected and the real transmitted number of HARQ bits, which in turn ensures downlink performance. In some cases, HARQ bundling is applied and DAI is used by the UE to identify a missed downlink assignment and report a NACK if that is the case.

A problem with existing solutions is that a UE has to send in the same uplink transmission HARQ feedback for downlink transmissions that occur at different times. This problem occurs for FDD.

If the UE misses downlink assignments on one of the scheduled carriers and on one of the scheduled subframes, there will be a mismatch between the total number of HARQ bits expected at the eNB and actually transmitted by the UE. Detection error of HARQ bits will occur and in turn negatively impact downlink performance. Thus, when channel collision happens between TTIs of different processing times or between TTI and sTTI, a good knowledge of the total number of HARQ bits expected by eNB is important to the downlink performance.

For legacy TTI, with the help of a DAI counter and/or a DAI total, a UE will have relatively good knowledge of the total expected number of HARQ bits. But the legacy DAI does not cover the case of FDD operation with different processing times and downlink transmissions occurring in different subframes to be fed back in the same uplink subframe. Because there is no DAI functionality for this case, if one or more downlink assignments are missed, the UE will not report the exact number of HARQ bits that are expected by eNB.

Particular embodiments obviate the problems described above and include a transmitter and receiver that have the same understanding on how many transport blocks and with what processing time have been sent, minimizing the risk that a missed detection of a transport block by the receiver results in the feedback transmitted being misinterpreted. Particular embodiments minimize this risk. For channel collision when PDSCH HARQ with n+4 processing timing and PDSCH HARQ with n+3 processing timing need to be transmitted in the same uplink channel, particular embodiments ensure that the eNB will not be confused by the mismatch between the total expected and real transmitted HARQ bits, thus reducing negative downlink performance because of channel collision.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 8-15B of the drawings, like numerals being used for like and corresponding parts of the various drawings. LTE and NR are used throughout this disclosure as an example cellular system, but the ideas presented herein may apply to other wireless communication systems as well.

Figure 10:
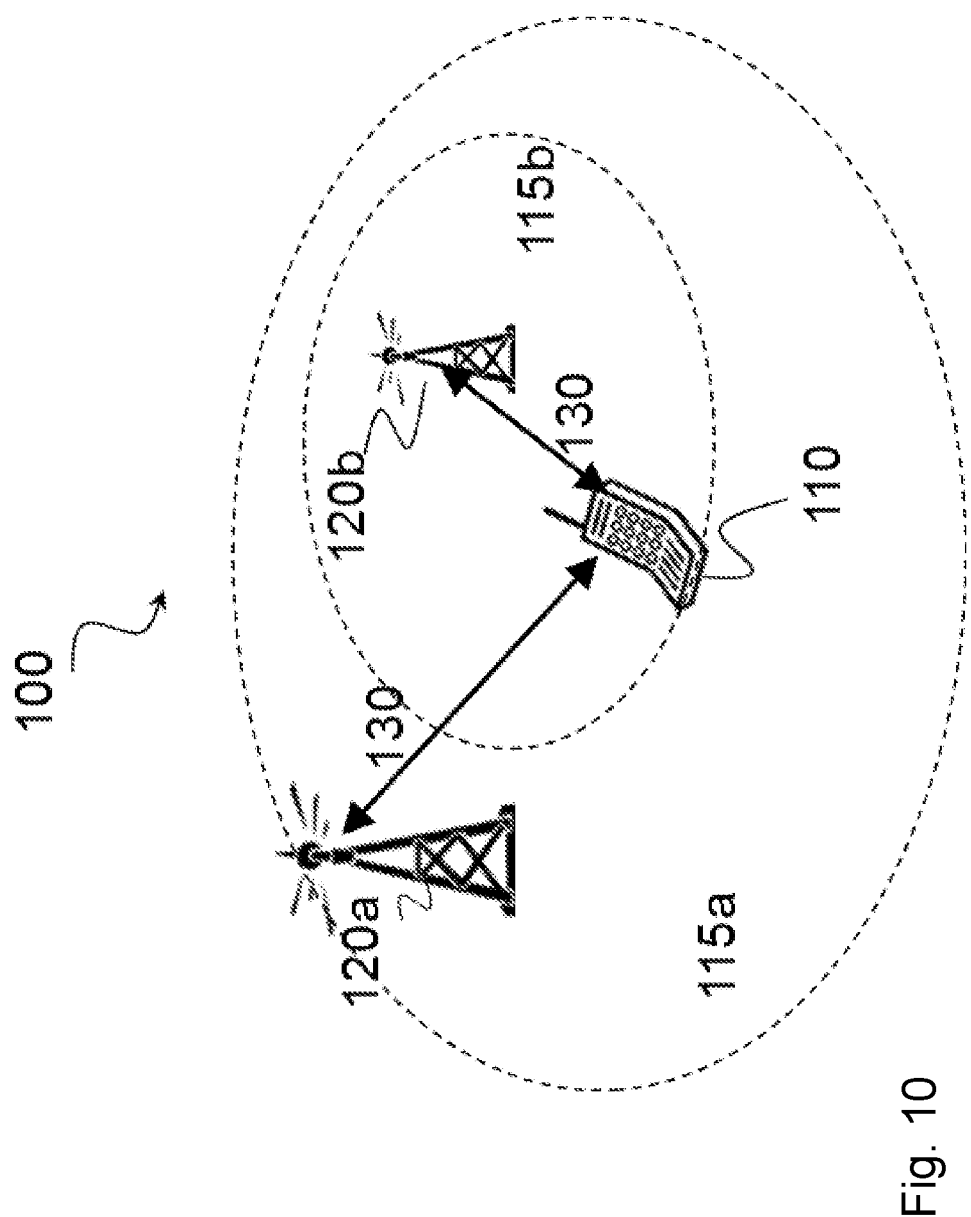
FIG. 10 is a block diagram illustrating an example wireless network, according to a particular embodiment.

FIG. 10 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots, such as those described with respect to FIGS. 1-9. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless signals 130 may include downlink scheduling. The downlink scheduling may include downlink control information (DCI). The DCI may include downlink assignment index (DAI). The DAI may include a total DAI and an accumulative DAI. Particular embodiments are described in more detail below.

In particular embodiments, network node 120 may schedules a first downlink transmission with a first transmission processing time (e.g., n+4). The scheduling comprises a first total DAI and a first accumulative DAI. Network node 120 may also schedule a second downlink transmission with a second transmission processing time different than the first processing time (e.g., n=3). The scheduling comprises a second total DAI and a second accumulative DAI. Network node 120 may expect HARQ feedback for the first downlink transmission and the second downlink transmission in the same uplink transmission. The DAI may be set according to any of the embodiments described in more detail below. Network node 120 may transmit the scheduling for the first and second downlink transmission to wireless device 110.

In particular embodiments, wireless device 100 receives scheduling for a first downlink transmission with a first transmission processing time (e.g., n+4). The scheduling comprises a first total DAI and a first accumulative DAI. Wireless device 100 may receive scheduling for a second downlink transmission with a second transmission processing time different than the first processing time (e.g., n=3). The scheduling comprises a second total DAI and a second accumulative DAI. Wireless device 110 may receive the first and second transmissions from network node 120. Wireless device 110 may transmit HARQ feedback for the first downlink transmission and the second downlink transmission in the same uplink transmission.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 14A below. Similarly, a network node may include any suitable combination of hardware and/or software. For example, in particular embodiments, a network node, such as network node 120, may include the components described with respect to FIG. 15A below.

In particular embodiments, ambiguity in HARQ feedback interpretation by an eNB after a collision between downlink data transmissions of different processing times that expect a HARQ feedback in the same carrier are solved. Particular embodiments include the scenario where the HARQ feedback for two downlink data transmissions having different required processing time should be reported in the same uplink subframe in a frequency division duplex (FDD) system. For shortened processing time, the downlink data transmissions are scheduled on different carriers that are configured with different processing timings.

The embodiments described herein are also applicable to the transmission of subslot in the downlink and slot in the uplink (see Table 1). In this case, the three downlink sTTIs of a LTE slot are fed back in a single uplink slot. That is, there is a different timing/processing time comparing the first, second and third downlink sTTI of the slot to the common uplink slot. This scenario could involve a single carrier transmission on downlink, i.e. all subslot transmissions that expect HARQ feedback in the same uplink transmission are performed on the same downlink carrier. An example is illustrated in FIG. 11.

Figure 11:
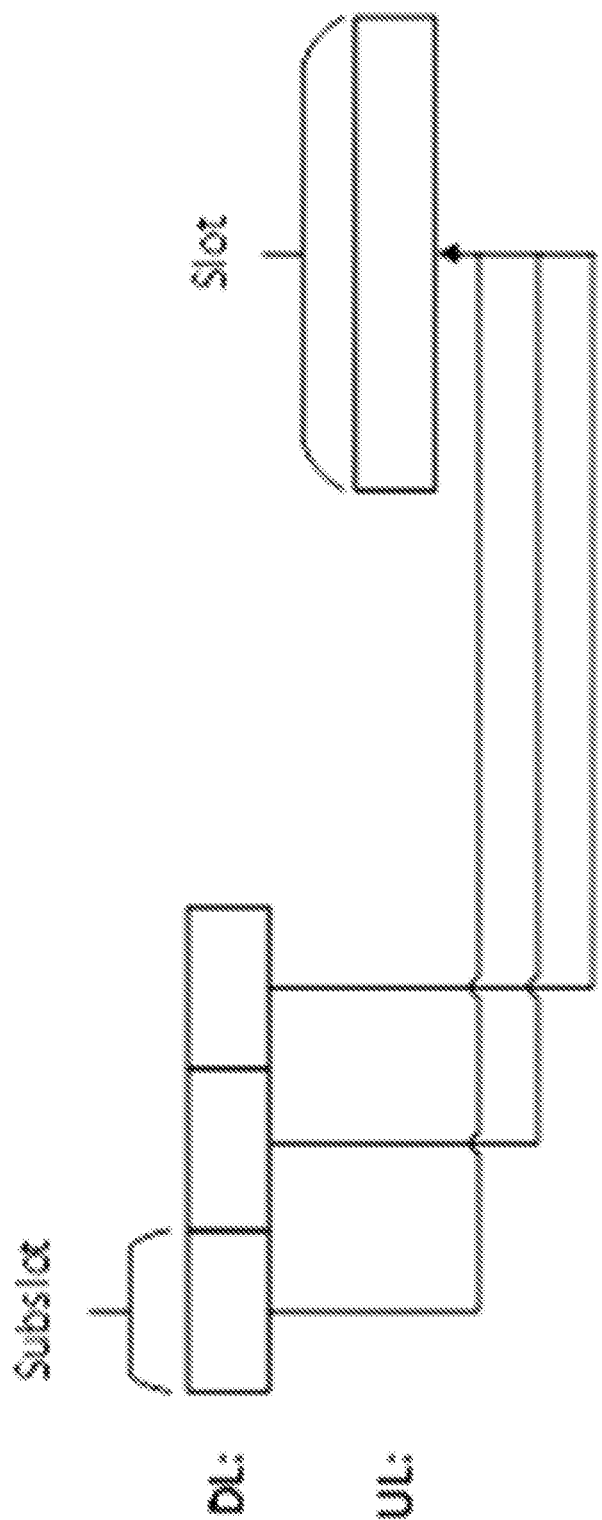
FIG. 11 illustrates processing time of a multiple downlink subslot transmission combined with a common uplink slot transmission, according to some embodiments.

FIG. 11 illustrates processing time of a multiple downlink subslot transmission combined with a common uplink slot transmission, according to some embodiments.

For the embodiments described herein, DAI is included in the downlink assignment for all carriers and includes a value for total DAI and a value for accumulative DAI. It can also be included in uplink grants for all carriers as HARQ feedback may be reported on uplink data channel instead of uplink control channel if an uplink data transmission is scheduled at the same time as a downlink HARQ feedback is expected.

A first group of embodiments includes a fixed total DAI value for all scheduled carriers (independently of their processing time). The total DAI for all scheduled downlink data transmissions with HARQ feedback expected in the same uplink subframe is set to the same value. The accumulative DAI is increased over time and over the scheduled carriers. For example, carrier 1 and carrier 2 are not configured with shortened processing time and operate with the legacy processing time of n+4 while carrier 0 and carrier 3 are configured with shortened processing time and operate with a n+3 timing. If carrier 1 and carrier 2 are scheduled in subframe n and carrier 0 and carrier 3 are scheduled in subframe n+1, the downlink data transmissions scheduled on those four carriers expect HARQ feedback in the same uplink subframe. The downlink assignment of all four downlink data transmissions includes a total DAI of 4 (or a modulo thereof). The accumulative DAI is increased over scheduled carriers at a given time and further increased for carriers scheduled at another time that expect HARQ feedback in the same uplink subframe. The method is illustrated in Table 4.

A drawback of this method is that the eNB has to schedule the carriers with shorter processing time at the same time as the downlink carriers with longer processing time to set the correct value for total DA. Thereby, the carriers of shorter processing time experience longer scheduling delay.

One alternative is to let the total DAI increment with scheduled carrier on a per scheduling time basis, i.e. in this example on a per subframe basis. This means there is no dependency on the scheduler to take the scheduling decision for carriers with shorter and longer processing time at the same time. The drawback is that the protection of knowing following scheduled decision by including the total value in all scheduled blocks is lost. The method is illustrated in Table 5.

TABLE 4

Example of how to set DAI values for
the first group of embodiments

|  | Subframe n | Subframe n + 1 |
|---|---|---|
| CC0 (n + 3) | — | X |
| CC1 (n + 4) | X | — |
| CC2 (n + 4) | X | — |
| CC3 (n + 3) | — | X |

| | Subframe n | | Subframe n + 1 | |
|---|---|---|---|---|
| CC index | Acc DAI | Total DAI | Acc. DAI | Total DAI |
| 0 | — | — | 3 | 4 |
| 1 | 1 | 4 | — | — |
| 2 | 2 | 4 | — | — |
| 3 | — | — | 4 | 4 |

(a) Scheduling decisions
(b) Accumulative DAI value and total DAI value in DL assignment for each carrier

TABLE 5

Example of how to set DAI values for the alternative
method in the first group of embodiments

|  | Subframe n | Subframe n + 1 |
|---|---|---|
| CC0 (n + 3) | — | X |
| CC1 (n + 4) | X | — |
| CC2 (n + 4) | X | — |
| CC3 (n + 3) | — | X |

| | Subframe n | | Subframe n + 1 | |
|---|---|---|---|---|
| CC index | Acc DAI | Total DAI | Acc. DAI | Total DAI |
| 0 | — | — | 3 | 4 |
| 1 | 1 | 2 | — | — |
| 2 | 2 | 2 | — | — |
| 3 | — | — | 4 | 4 |

(a) Scheduling decisions
(b) Accumulative DAI value and total DAI value in DL assignment for each carrier A second group of embodiments includes independent DAT values for carriers with different processing times. The DAT values are set according to the scheduled downlink data transmissions with a given processing time. The carriers can be grouped according to their processing time. There can be a group of carriers with processing time k1 and another group of carriers with processing time k2. The DAT values are decided for carriers within one group and are independent of the scheduling decisions for carriers belonging to another group. The total DAT is set according to the total number of carriers with same processing time scheduled in a subframe. The accumulative DAT is increased with increasing carrier index of the scheduled carriers belonging to the same group.

One advantage of this method is that the eNB does not need to schedule the carriers with shorter processing time at the same time as the downlink carriers with longer processing time. In addition, the existing HARQ feedback procedure can be kept the same. If k different processing times were configured over different carriers, the procedure has just to be run k times, once for carriers of each processing time configured. This way, the UE obtains k bit sequences that should be multiplexed and transmitted in the same uplink subframe (if feedback is expected in the same uplink subframe). The k bit sequences can be concatenated or can be reshuffled to obtain a single bit sequence that provides HARQ feedback for carriers in increasing carrier index.

Because there is no coupling between the DAI values in subframe n for carriers of long processing time and the DAI values in a later subframe for carriers with shorter processing time, this algorithm does not solve the case where all downlink assignments sent in subframe n for carriers with long processing time are missed. It will not enable the UE to detect those missed assignments.

Table 6 and Table 7 give an example of how to set DAI values for the second group of embodiments. The first group f carriers with n+4 timing include carrier 1 and carrier 2. The second group of carriers with n+3 timing include carrier 0 and carrier 3.

TABLE 6

Example of Scheduling decisions

|  | Subframe n | Subframe n + 1 | Subframe n + 2 | Subframe n + 3 |
|---|---|---|---|---|
| CC0 (n + 3) | — | X | X | X |
| CC1 (n + 4) | X | X | — | — |
| CC2 (n + 4) | — | X | X | — |
| CC3 (n + 3) | X | — | x | x |

TABLE 7

Example of the second group of embodiments - Accumulative DAI value and total DAI value in downlink assignment for each carrier for the scheduling decisions of Table 6

| | Subframe n | | Subframe n + 1 | | Subframe n + 2 | | Subframe n + 3 | |
|---|---|---|---|---|---|---|---|---|
| CC index | Acc DAI | Tot DAI | Acc DAI | Tot DAI | Acc DAI | Tot DAI | Acc DAI | Tot DAI |
| 0 | — | — | 1 | 1 | 1 | 2 | 1 | 2 |
| 1 | 1 | 1 | 1 | 2 | — | — | — | — |
| 2 | — | — | 2 | 2 | 1 | 1 | — | — |
| 3 | 1 | 1 | — | — | 2 | 2 | 2 | 2 |

A third group of embodiments includes time-incremented DAI values for carriers with lower processing time. The DAI values of the scheduled carrier with shorter processing time depend on the DAI values of scheduled carriers with longer processing time that expect HARQ feedback in the same uplink subframe.

The total DAI for carriers scheduled in a given downlink subframe is set according to the total number of carriers with the same processing time scheduled in this subframe plus the total number of carriers with longer processing times that were already scheduled up to the present downlink subframe. The accumulative DAI is increased with increasing carrier index of the carriers scheduled in that subframe, but its initial value is set to the total number of carriers with longer processing times that were already scheduled up to the present downlink subframe.

By coupling the DAI values for carriers with shorter processing time to the DAI values of carriers of longer processing time, the UE may detect a missed downlink assignment in previous subframes that expect a HARQ feedback in the same uplink subframe as later downlink assignment.

When preparing the bit sequence according to the third group of embodiments, the bit sequence will include HARQ feedback for each carrier scheduled in earlier downlink subframes first (in increasing order of carrier index), then HARQ feedback for each carrier scheduled in later subframes, etc. Because there will be HARQ feedback for one carrier only from a single downlink subframe, the bit sequence can be reshuffled to obtain HARQ feedback for carriers in increasing carrier index (independently of their processing time).

TABLE 8

Example of the third group of embodiments - Accumulative DAI value and total DAI value in downlink assignment for each carrier for the scheduling decisions of Table 6

| | Subframe n | | Subframe n + 1 | | Subframe n + 2 | | Subframe n + 3 | |
|---|---|---|---|---|---|---|---|---|
| CC index | Acc DAI | Tot DAI | Acc DAI | Tot DAI | Acc DAI | Tot DAI | Acc DAI | Tot DAI |
| 0 | — | — | 2 | 2 | 3 | 4 | 2 | 3 |
| 1 | 1 | 1 | 1 | 2 | — | — | — | — |
| 2 | — | — | 2 | 2 | 1 | 1 | — | — |
| 3 | 1 | 1 | — | — | 4 | 4 | 3 | 3 |

Figure 12:
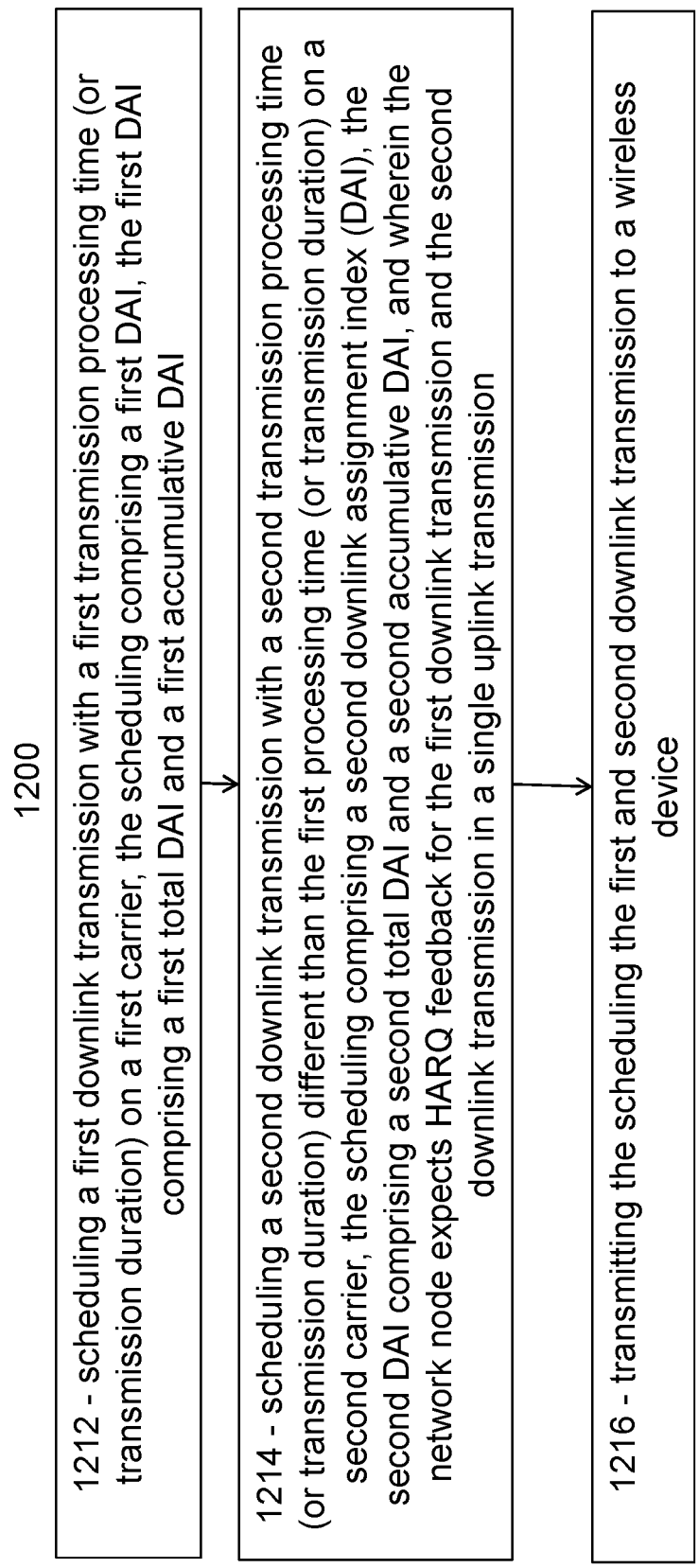
FIG. 12 is flow diagram illustrating an example method in a network node, according to particular embodiments.

FIG. 12 is a flow diagram illustrating an example method in a network node, according to particular embodiments. In particular embodiments, one or more steps of FIG. 12 may be performed by network node 120 of network 100 described with respect to FIG. 10.

The method begins at step 1212, where the network node schedules a first downlink transmission with a first transmission processing time or first transmission duration. The scheduling comprises a first DAI, which includes a first total DAI and a first accumulative DAI.

For example, network node 120 may schedule a 1 ms TTI transmission with a n+4 transmission processing time. The DAI may be set according to any of the first, second, and third group of embodiments described above.

With respect to the first group of embodiments, the first total DAI may refer to a total number of downlink transmissions with HARQ feedback expected in the single uplink transmission at n+4. For example, the first total DAI may be set to 4 corresponding to CC index 2 at subframe n in Table 4(b). The first accumulative DAI may be set to a number of downlink transmissions with HARQ feedback expected in the single uplink transmission at n+4 that are scheduled at the first transmission time n. For example, the first accumulative DAI may be set to 2, corresponding to CC index 2 at subframe n in Table 4(b).

With respect to the second group of embodiments, the first downlink transmission may be associated with a first group of frequency carriers that share the same n+4 transmission processing time. The first total DAI may be set to a total number of downlink transmissions with HARQ feedback expected in the single uplink transmission at n+4 for the first group of frequency carriers. For example, the first total DAI may be set to 1 corresponding to CC index 1 at subframe n in Table 7. The first accumulative DAI may be set to a number of downlink transmissions with HARQ feedback expected in the single uplink transmission at n+4 that are previously scheduled at the first transmission time n for the first group of frequency carriers. For example, the first accumulative DAI may be set to 1 corresponding to CC index 1 at subframe n in Table 7.

With respect to the third group of embodiments, the first total DAI may be set to a total number of downlink transmissions with HARQ feedback expected in the single uplink transmission at n+4 that are scheduled at the first transmission time n. For example, the first total DAI may be set to 1 corresponding to CC index 1 at subframe n in Table 8. The first accumulative DAI may be set to a number of downlink transmissions with HARQ feedback expected in the single uplink transmission at n+4 that are previously scheduled at the first transmission time n. For example, the first accumulative DAI may be set to 1 corresponding to CC index 1 at subframe n in Table 8.

Figure 9:
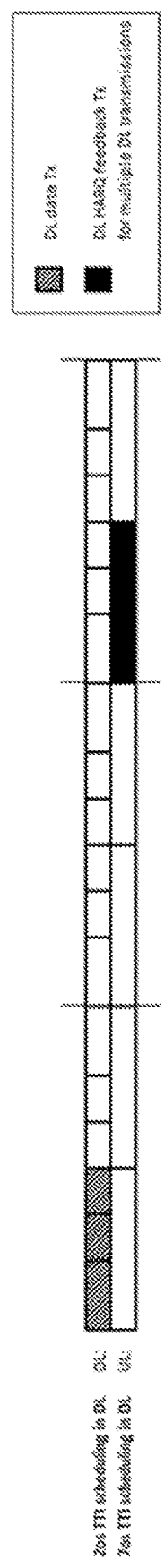
FIG. 9 illustrates joint transmission of HARQ feedback for multiple downlink TTI transmissions of shorter length than the uplink TTI length.

As another example, the network node may schedule a 2 os TTI transmission with a n+4 transmission processing time. The DAI may be set according to any of the first, second, and third group of embodiments described above. For example, FIG. 9 illustrates an example of 2 os transmission duration on a downlink carrier and 7 os transmission duration scheduling in the uplink. With respect to the third group of embodiments, the first total DAI may be set to a total number of downlink transmissions with HARQ feedback expected in the single uplink transmission that are scheduled at the first downlink transmission time n. For example, the first total DAI may be set to 1. The first accumulative DAI may be set to a number of downlink transmissions with HARQ feedback expected in the single uplink transmission that are previously scheduled at the first transmission time. For example, the first accumulative DAI may be set to 1.

At step 1214, the network node schedules a second downlink transmission with a second transmission processing time or transmission duration different than the first processing time or transmission duration. The scheduling comprises a second DAI, which comprises a second total DAI and a second accumulative DAI. The network node expects HARQ feedback for the first downlink transmission and the second downlink transmission in the same uplink transmission.

For example, network node 120 may schedule a second downlink transmission with a n+3 transmission processing time. The DAI may be set according to any of the first, second, and third group of embodiments described above.

With respect to the first group of embodiments, the second total DAI may refer to a total number of downlink transmissions with HARQ feedback expected in the single uplink transmission at n+4. For example, the second total DAI may be set to 4 corresponding to CC index 0 at subframe n+1 in Table 4(b). The second accumulative DAI may be set to a number of downlink transmissions with HARQ feedback expected in the single uplink transmission at n+4 that are scheduled at the transmission time n and n+1. For example, the second accumulative DAI may be set to 3, corresponding to CC index 0 at subframe n+1 in Table 4(b).

With respect to the second group of embodiments, the second downlink transmission may be associated with a second group of frequency carriers that share the same n+3 transmission processing time. The second total DAI may be set to a total number of downlink transmissions with HARQ feedback expected in the single uplink transmission at n+4 for the second group of frequency carriers. For example, the second total DAI may be set to 1 corresponding to CC index 0 at subframe n+1 in Table 7. The second accumulative DAI may be set to a number of downlink transmissions with HARQ feedback expected in the single uplink transmission at n+4 that are previously scheduled at the first transmission time n for the second group of frequency carriers. For example, the second accumulative DAI may be set to 1 corresponding to CC index 0 at subframe n+1 in Table 7.

With respect to the third group of embodiments, the second total DAI may be set to a total number of downlink transmissions with HARQ feedback expected in the single uplink transmission at n+4 that are scheduled at the first transmission time n and the second transmission time n+1. For example, the second total DAI may be set to 2 corresponding to CC index 1 at subframe n+1 in Table 8. The second accumulative DAI may be set to a number of downlink transmissions with HARQ feedback expected in the single uplink transmission at n+4 that are previously scheduled at the first transmission time n and the second transmission time n+1. For example, the second accumulative DAI may be set to 1 corresponding to CC index 1 at subframe n+1 in Table 8.

As another example, the network node may schedule a 2 os TTI transmission with a n+4 transmission processing time (e.g., see FIG. 9). The DAI may be set according to any of the first, second, and third group of embodiments described above. With respect to the third group of embodiments, the second total DAI may be set to a total number of downlink transmissions with HARQ feedback expected in the single uplink transmission that are scheduled at the first downlink transmission time n and the second downlink transmission time n+1. For example, the second total DAI may be set to 2. The second accumulative DAI may be set to a number of downlink transmissions with HARQ feedback expected in the single uplink transmission that are previously scheduled at the first transmission time n and the second downlink transmission time n+1. For example, the second accumulative DAI may be set to 2.

At step 1216, the network node transmits the scheduling for the first and second downlink transmission to a wireless device. For example, network node 120 may transmit the scheduling to wireless device 110.

Modifications, additions, or omissions may be made to method 1200 of FIG. 12. Additionally, one or more steps in the method of FIG. 12 may be performed in parallel or in any suitable order. The steps may be repeated over time as necessary. In some embodiments, the first and second transmissions may comprise a different transmission duration than the uplink duration (i.e., sTTI in downlink and 1 ms in uplink).

Figure 13:
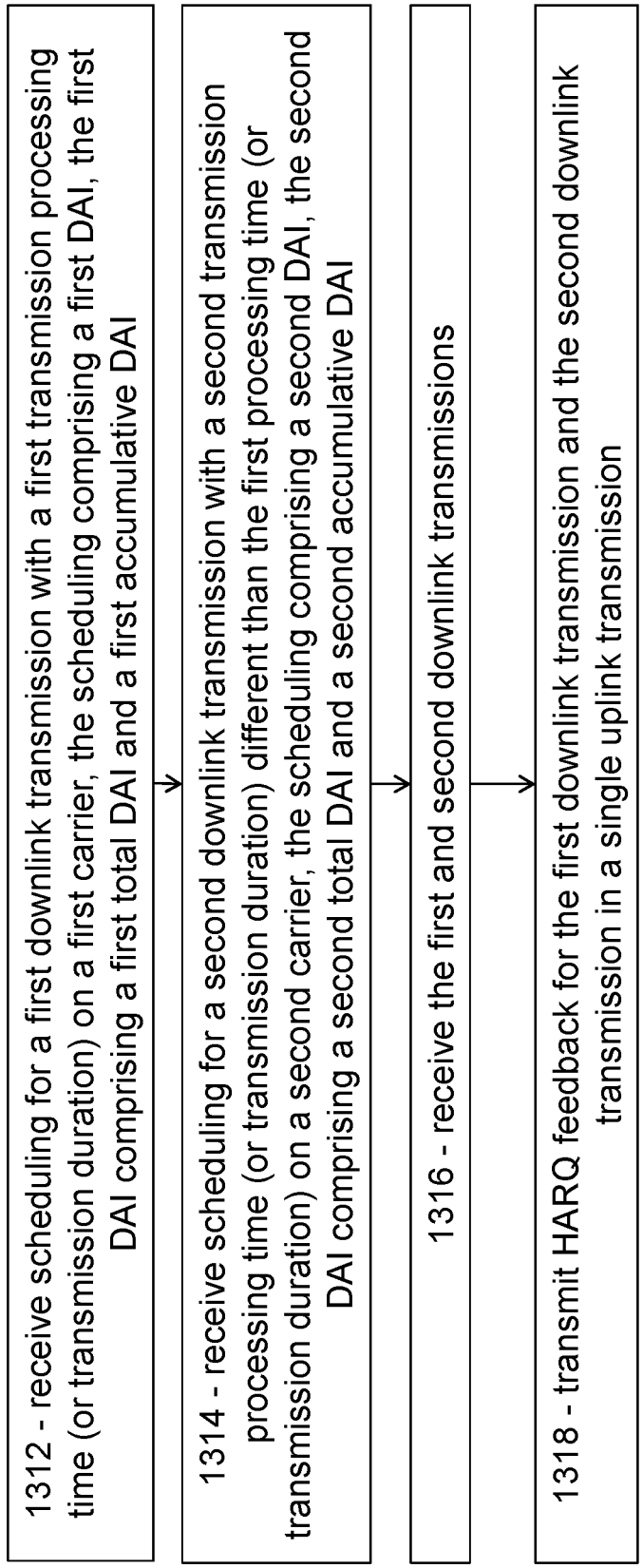
FIG. 13 is a flow diagram illustrating an example method in a user equipment, according to particular embodiments.

FIG. 13 is a flow diagram illustrating an example method in a wireless device, according to particular embodiments. In particular embodiments, one or more steps of FIG. 13 may be performed by network node 120 of network 100 described with respect to FIG. 10.

The method begins at step 1312, where the wireless device receives scheduling for a first downlink transmission with a first transmission processing time or first transmission duration. The scheduling comprises a first DAI, which includes a first total DAI and a first accumulative DAI.

For example, wireless device 110 may receive scheduling for a 1 ms TTI transmission with a n+4 transmission processing time. The DAI may be set according to any of the first, second, and third group of embodiments described above.

With respect to the first group of embodiments, the first total DAI may refer to a total number of downlink transmissions with HARQ feedback expected in the single uplink transmission at n+4. For example, the first total DAI may be set to 4 corresponding to CC index 2 at subframe n in Table 4(b). The first accumulative DAI may be set to a number of downlink transmissions with HARQ feedback expected in the single uplink transmission at n+4 that are scheduled at the first transmission time n. For example, the first accumulative DAI may be set to 2, corresponding to CC index 2 at subframe n in Table 4(b).

With respect to the second group of embodiments, the first downlink transmission may be associated with a first group of frequency carriers that share the same n+4 transmission processing time. The first total DAI may be set to a total number of downlink transmissions with HARQ feedback expected in the single uplink transmission at n+4 for the first group of frequency carriers. For example, the first total DAI may be set to 1 corresponding to CC index 1 at subframe n in Table 7. The first accumulative DAI may be set to a number of downlink transmissions with HARQ feedback expected in the single uplink transmission at n+4 that are previously scheduled at the first transmission time n for the first group of frequency carriers. For example, the first accumulative DAI may be set to 1 corresponding to CC index 1 at subframe n in Table 7.

With respect to the third group of embodiments, the first total DAI may be set to a total number of downlink transmissions with HARQ feedback expected in the single uplink transmission at n+4 that are scheduled at the first transmission time n. For example, the first total DAI may be set to 1 corresponding to CC index 1 at subframe n in Table 8. The first accumulative DAI may be set to a number of downlink transmissions with HARQ feedback expected in the single uplink transmission at n+4 that are previously scheduled at the first transmission time n. For example, the first accumulative DAI may be set to 1 corresponding to CC index 1 at subframe n in Table 8.

As another example, the network node may schedule a 2 os TTI transmission with a n+4 transmission processing time. The DAI may be set according to any of the first, second, and third group of embodiments described above. For example, FIG. 9 illustrates an example of 2 os transmission duration on a downlink carrier and 7 os transmission duration scheduling in the uplink. With respect to the third group of embodiments, the first total DAI may be set to a total number of downlink transmissions with HARQ feedback expected in the single uplink transmission that are scheduled at the first downlink transmission time n. For example, the first total DAI may be set to 1. The first accumulative DAI may be set to a number of downlink transmissions with HARQ feedback expected in the single uplink transmission that are previously scheduled at the first transmission time. For example, the first accumulative DAI may be set to 1.

At step 1314, the wireless device receives scheduling for a second downlink transmission with a second transmission processing time different than the first processing time. The scheduling comprising a second DAI. The second DAI comprises a second total DAI and a second accumulative DAI.

For example, wireless device 110 may receive scheduling for a second downlink transmission with a short TTI with a n+3 transmission processing time. The DAI may be set according to any of the first, second, and third group of embodiments described above.

With respect to the first group of embodiments, the second total DAI may refer to a total number of downlink transmissions with HARQ feedback expected in the single uplink transmission at n+4. For example, the second total DAI may be set to 4 corresponding to CC index 0 at subframe n+1 in Table 4(b). The second accumulative DAI may be set to a number of downlink transmissions with HARQ feedback expected in the single uplink transmission at n+4 that are scheduled at the transmission time n and n+1. For example, the second accumulative DAI may be set to 3, corresponding to CC index 0 at subframe n+1 in Table 4(b).

With respect to the second group of embodiments, the second downlink transmission may be associated with a second group of frequency carriers that share the same n+3 transmission processing time. The second total DAI may be set to a total number of downlink transmissions with HARQ feedback expected in the single uplink transmission at n+4 for the second group of frequency carriers. For example, the second total DAI may be set to 1 corresponding to CC index 0 at subframe n+1 in Table 7. The second accumulative DAI may be set to a number of downlink transmissions with HARQ feedback expected in the single uplink transmission at n+4 that are previously scheduled at the first transmission time n for the second group of frequency carriers. For example, the second accumulative DAI may be set to 1 corresponding to CC index 0 at subframe n+1 in Table 7.

With respect to the third group of embodiments, the second total DAI may be set to a total number of downlink transmissions with HARQ feedback expected in the single uplink transmission at n+4 that are scheduled at the first transmission time n and the second transmission time n+1. For example, the second total DAI may be set to 2 corresponding to CC index 1 at subframe n+1 in Table 8. The second accumulative DAI may be set to a number of downlink transmissions with HARQ feedback expected in the single uplink transmission at n+4 that are previously scheduled at the first transmission time n and the second transmission time n+1. For example, the second accumulative DAI may be set to 1 corresponding to CC index 1 at subframe n+1 in Table 8.

As another example, the network node may schedule a 2 os TTI transmission with a n+4 transmission processing time (e.g., see FIG. 9). The DAI may be set according to any of the first, second, and third group of embodiments described above. With respect to the third group of embodiments, the second total DAI may be set to a total number of downlink transmissions with HARQ feedback expected in the single uplink transmission that are scheduled at the first downlink transmission time n and the second downlink transmission time n+1. For example, the second total DAI may be set to 2. The second accumulative DAI may be set to a number of downlink transmissions with HARQ feedback expected in the single uplink transmission that are previously scheduled at the first transmission time n and the second downlink transmission time n+1. For example, the second accumulative DAI may be set to 2.

At step 1316, the wireless device receives the first and second downlink transmissions. For example, wireless device 110 may receive the first and second downlink transmissions from network node 120.

At step 1318, the wireless device transmits HARQ feedback for the first downlink transmission and the second downlink transmission in the same uplink transmission. For example, wireless device 110 may decode the first and second downlink transmissions from network node 120 and send the HARQ feedback for both transmissions in a single uplink transmission.

Modifications, additions, or omissions may be made to method 1300 of FIG. 13. Additionally, one or more steps in the method of FIG. 13 may be performed in parallel or in any suitable order. The steps may be repeated over time as necessary. In some embodiments, the first and second transmissions may comprise a different transmission duration than the uplink duration (i.e., sTTI in downlink and 1 ms in uplink).

Figure 14B:
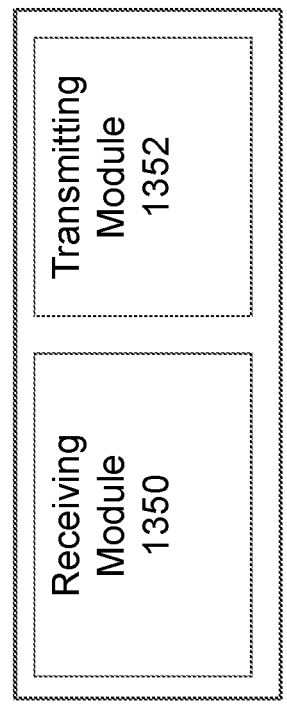
FIG. 14B is a block diagram illustrating example components of a wireless device.
Figure 14A:
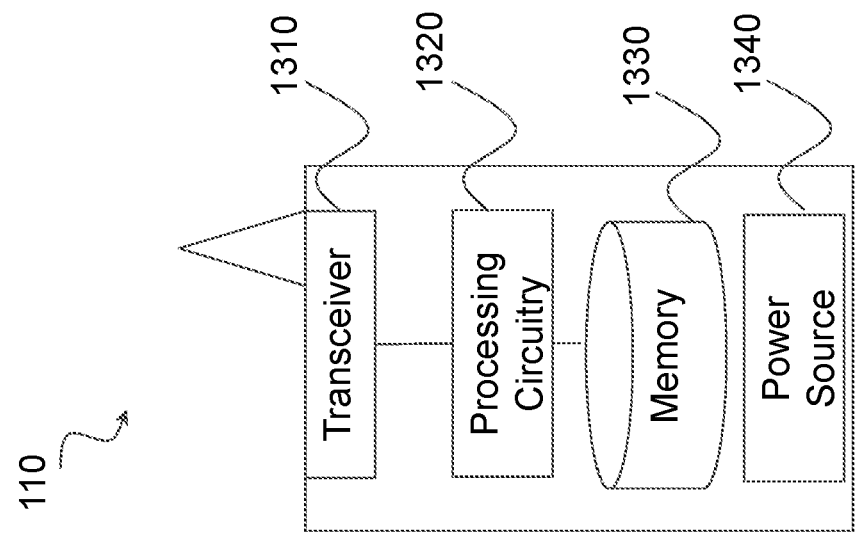
FIG. 14A is a block diagram illustrating an example embodiment of a wireless device.

FIG. 14A is a block diagram illustrating an example embodiment of a wireless device. The wireless device is an example of the wireless devices 110 illustrated in FIG. 10. In particular embodiments, the wireless device is capable of receiving downlink transmissions with different processing times and sending HARQ feedback in a single uplink transmission.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 14A) responsible for providing certain aspects of the wireless device's functionality, including any of the functionality described above and/or any additional functionality (including any functionality necessary to support the solution described above).

FIG. 14B is a block diagram illustrating example components of a wireless device 110. The components may include receiving module 1350 and transmitting module 1352.

Receiving module 1350 may perform the receiving functions of wireless device 110. For example, receiving module 1350 may receive scheduling for downlink transmissions with different processing times. The scheduling may include total DAI and accumulative DAI. Receiving module 1350 may perform the receiving functions according to any of the examples and embodiments described above. In certain embodiments, receiving module 1350 may include or be included in processing circuitry 1320. In particular embodiments, receiving module 1350 may communicate with transmitting module 1354.

Transmitting module 1354 may perform the transmitting functions of wireless device 110. For example, transmitting module 1354 may transmit HARQ responses to a network node. In certain embodiments, transmitting module 1354 may include or be included in processing circuitry 1320. In particular embodiments, transmitting module 1354 may communicate with receiving module 1350.

Figure 15B:
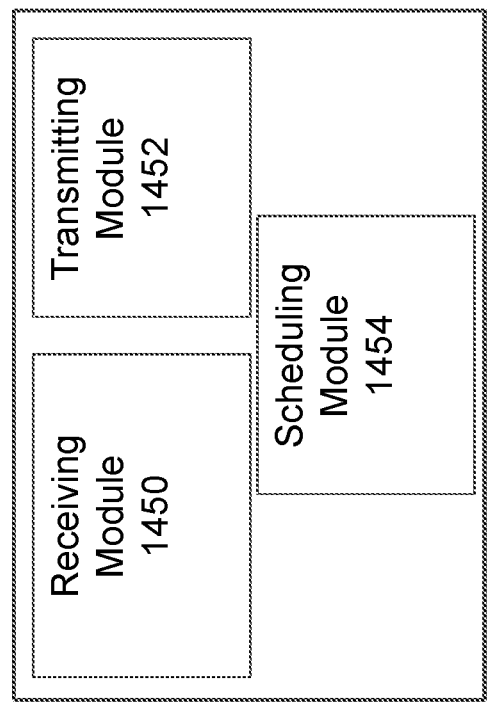
FIG. 15B is a block diagram illustrating example components of a network node.
Figure 15A:
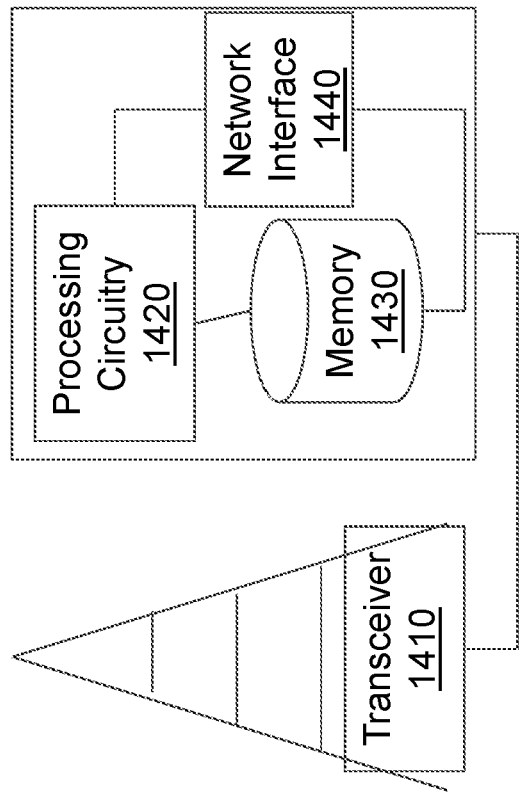
FIG. 15A is a block diagram illustrating an example embodiment of a network node.

FIG. 15A is a block diagram illustrating an example embodiment of a network node. The network node is an example of the network node 120 illustrated in FIG. 10. In particular embodiments, the network node is capable of transmitting downlink transmissions with different processing times and receiving HARQ feedback for the transmissions in a single uplink transmission.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 14A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 14B is a block diagram illustrating example components of a network node 120. The components may include receiving module 1450, transmitting module 1452, and scheduling module 1454.

Receiving module 1450 may perform the receiving functions of network node 120. For example, receiving module 1450 may receive HARQ feedback for downlink transmissions transmitted with different processing times in a single uplink transmission, according to any of the embodiments or examples described above. In certain embodiments, receiving module 1450 may include or be included in processing circuitry 1420. In particular embodiments, receiving module 1450 may communicate with transmitting module 1452 and scheduling module 1454.

Transmitting module 1452 may perform the transmitting functions of network node 120. For example, transmitting module 1452 may transmit downlink scheduling and downlink transmissions to wireless device 110. In certain embodiments, transmitting module 1452 may include or be included in processing circuitry 1420. In particular embodiments, transmitting module 1452 may communicate with receiving module 1450 and scheduling module 1454.

Scheduling module 1454 may perform the scheduling functions of network node 120. For example, scheduling module 1454 may downlink transmissions with total and accumulative DAI for downlink transmissions of different processing times according to any of the examples and embodiments described above. In certain embodiments, scheduling module 1454 may include or be included in processing circuitry 1420. In particular embodiments, transmitting module 1452 may communicate with receiving module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

A first node and a second node are sometimes described as two nodes. An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPad, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In this invention, any of the above mentioned nodes could become "the first node" and/or "the second node".

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term signal used herein can be any physical signal or physical channel. Examples of physical signals are reference signal such as PSS, SSS, CRS, PRS, etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

The term requirements used herein may comprise any type of UE requirements related to UE measurements aka radio requirements, measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are Li measurement period, cell identification time or cell search delay, CGI acquisition delay etc.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The example below provides a non-limiting example of how certain aspects particular embodiments could be implemented within the framework of a specific communication standard. In particular, the example below provides a non-limiting example of how the particular embodiments could be implemented within the framework of a 3GPP TSG RAN standard. The changes described by the example are merely intended to illustrate how certain aspects of the particular embodiments could be implemented in a particular standard. However, the particular embodiments could also be implemented in other suitable manners, both in the 3GPP Specification and in other specifications or standards.

Regarding reduced processing time for 1 ms TTI, for FS1,2&3, a minimum timing n+3 is supported for UL grant to UL data and for DL data to DL HARQ for UEs capable of operating with reduced processing time with only the following conditions: (a) a maximum TA is reduced to x ms, where x<=0.33 ms, for example; (b) at least when scheduled by PDCCH. Reduced processing time(s) are RRC configured for the UE. For 1 ms TTI, shortened processing times between UL grant and UL data and between DL data and DL HARQ feedback for one carrier are jointly configured.

Particular embodiments may down-select between alternative 1 and alternative 2. Alternative 1 includes shortened processing time for 1 ms TTI configured per CC. The cell carrying the PUCCH is configured with n+3 timing. Alternative 2 includes shortened processing time for 1 ms TTI configured per PUCCH group.

The example describes some aspects of the RRC configuration of reduced processing time. Open issues are mainly for the case where a UE is configured with multiple carriers.

With shortened processing time, the HARQ feedback for a PDSCH sent in subframe n can be reported in the UL subframe n+3. HARQ feedback timing includes detecting the DL assignment, decoding of the DL data transmission on a given cell and preparing the UL HARQ feedback transmission on the PUCCH cell that can be different from the DL cell. To ensure a shorter HARQ feedback timing, both cells should support the shortened processing time feature. A pre-requisite is thus that shortened processing time is configured in the PUCCH cell.

In a first proposal, shortened processing time is configured in the cell where PUCCH is transmitted. In case of cross-carrier scheduling, the DL assignment/UL grant is sent on a different carrier than the scheduled carrier. If the scheduled carrier is configured with shortened processing time, the scheduling carrier should also be configured with shortened processing time to ensure the shorter timing can be realized. A cell of shortened processing time could cross-carrier schedule a cell with regular processing time. However, coupling the carrier where the assignment/grant is received and the applicable processing time is a simple relationship with an acceptable limitation.

In a second proposal, a cross-carrier scheduled cell and its scheduling cell have the same configured processing time. Shortened processing time is in general beneficial to operate with the assumption that there is no restriction associated with it. In case of carrier aggregation and a remote radio head scenario, some cells could have a larger TA than some of the other aggregated cells. To allow operation in such scenarios it would consequently be beneficial to allow configuration of shortened processing time per carrier.

In case of fixed HARQ-ACK codebook size, the ACK/NAK bits for all configured carriers are present in the reported HARQ feedback even if a carrier was not scheduled. The bits are set to NAK for carriers that were not scheduled in the corresponding subframe. The only change for FS1 is how to interpret the bit sequence. The HARQ feedback corresponding to carriers configured with n+3 in the bit sequence refers to a different DL subframe than the HARQ feedback corresponding to carriers not configured with n+3 in the bit sequence. The change is also straight forward for FS2 where already today an UL subframe reports feedback for multiple DL subframes. The number of bits to be reported for the c-th serving cell configured by RRC depends on the number of elements in the downlink association set associated with subframe n. For cells configured with n+3 timing, the only change required is to refer to the correct downlink association set that will be introduced for n+3 timing.

Changes required to the FS1 and FS2 HARQ feedback procedures in case of non-dynamic HARQ ACK codebook size for the per CC configuration of n+3 are minor. In case of dynamic HARQ-ACK codebook size, the DAI field present in the DCI would need to change in case of per CC configuration in order to detect missed assignments for n+4 and n+3 carriers whose HARQ feedback is expected in the same UL subframe. Here also, the methodology used for FS2 can be easily extended for this case and also adapted to FS1.

In FS2, the accumulative DAI and the total DAI are increased over two dimensions: the carrier dimension first and the time dimension second. In a given subframe, DAI is increased for each scheduled component carriers, then DAI is further increased in further subframes having HARQ feedback in the considered UL subframe if carriers are scheduled in those further DL subframes as well. The only change required to enable per CC configuration of n+3 is to check in the loop over the carriers c and the DL subframes n-k if this carrier c is expecting HARQ feedback for the DL subframe n-k in the current UL subframe. That way, the accumulative DAI is not increased if HARQ feedback for a carrier is expected in the next UL subframe or has been prepared already in an earlier UL subframe.

In case of dynamic HARQ ACK codebook size and per CC configuration of n+3, the DAI variables need to be adapted.

In case of FS2 with dynamic HARQ ACK codebook size and per CC configuration of n+3, the changes to the DAI variables are minor. In case of FS1, a single DL subframe for a given carrier is expecting HARQ feedback in a given UL subframe. In case of FS1 and dynamic HARQ-ACK codebook size, two DL subframes can have HARQ feedback for different carriers in the same UL subframe if a UE is scheduled on consecutive DL subframes with n+3 carriers and n+4 carriers.

A similar algorithm as for FS2 can be used where the accumulative DAI is increased over the carriers that are scheduled at the given time and over time (i.e. over the 2 DL subframes that have HARQ feedback in the same UL subframe). The total DAI is also increased in the second subframe if n+3 carriers have been scheduled there. Note that the bit sequence needs to be reshuffled to obtain HARQ bits in increasing order of the cell index if the exact same algorithm as for FS2 is used for FS1.

An alternative is to have independent DAI variables for n+3 and n+4 carriers. That means that scheduled n+4 carriers do not affect the DAI included in the DCI of scheduled n+3 carriers (and vice-versa) even though the n+4 and n+3 carriers may expect HARQ feedback in the same UL subframe. In this variant as well, the bit sequence needs to be reshuffled to obtain HARQ bits in increasing order of the cell index.

In case of FS1 with dynamic HARQ ACK codebook size and per CC configuration of n+3, the changes to the DAI variables can be minor but the bit sequence is either different than today or it needs to be reshuffled. Considering the changes required to enable the per CC configuration of n+3 and the flexibility it offers to the eNB, a per CC configuration of shortened processing time for 1 ms TTI should be adopted.

A third proposal includes shortened processing time configured separately for different cells A fourth proposal includes shortened processing time configured on a per cell basis for DL-only cell(s).

The following includes possible changes to the HARQ feedback procedure in case of FS2 and dynamic HARQ-ACK codebook size (section 7.3.2.1 in TS36.213). If a UE is configured with shortened processing time and with higher layer parameter codebooksizeDetermination-r13=dai and if the UE transmits HARQ-ACK using PUCCH format 3 or PUCCH format 4 or PUCCH format 5 in subframe n, the UE shall determine the $\tilde{o}_0^{ACK}, \tilde{o}_1^{ACK}, \ldots, \tilde{o}_{o^{ACK}-1}^{ACK}$ according to the following pseudo-code:

Set c = 0 – cell index: lower indices correspond to lower RRC indices of corresponding cell
Set $K_c$ to K in Table xx or K in Table yy depending if cell c is configured with
shortened processing time or not, for all c = 0 – cell index.

$$\text{Set } K_u = \bigcup_c K_c$$

Set m = 0 – subframe index: lower index corresponds to earlier subframe within
subframe(s) n – k where k $\in K_u$
Set j = 0
Set $V_{temp}$ = 0
Set $V_{temp2}$ = 0
Set $V_s$ = $\emptyset$
Set $N_{cells}^{DL}$ to the number of cells configured by higher layers for the UE
Set M to the number of subframes within subframe(s) n – k where k $\in K_u$
   while m < M
   while c < $N_{cells}^{DL}$
if $K_u$(m) $\in K_c$
if there is a PDSCH on serving cell c in subframe m associated with
PDCCH/EPDCCH or there is a PDCCH/EPDCCH indicating downlink SPS release on
serving cell c in subframe m,
    if $V_{C-DAI,c,m}^{DL} \leq V_{temp}$
      j = j + 1
   end if
$V_{temp} = V_{C-DAI,c,m}^{DL}$
if $V_{T-DAI,m}^{DL}$ = 0
    $V_{temp2} = V_{C-DAI,c,m}^{DL}$
else
    $V_{temp2} = V_{T-DAI,m}^{DL}$
end if
if the higher layer parameter spatialBundlingPUCCH is set FALSE and the UE is
configured with a transmission mode supporting two transport blocks in at least one
configured serving cell, $\tilde{o}^{ACK}_{8j+2(V_{C-DAI,c,m}^{DL}-1)}$ = HARQ-ACK bit corresponding to the first codeword of this cell $\tilde{o}^{ACK}_{8j+2(V_{C-DAI,c,m}^{DL}-1)+1}$ = HARQ-ACK bit corresponding to the second codeword of this cell $V_s = V_s \cup \{8j + 2(V_{C-DAI,c,m}^{DL} - 1), 8j + 2(V_{C-DAI,c,m}^{DL} - 1) + 1\}$ Else if the higher layer parameter spatialBundlingPUCCH is set TRUE and the UE is configured with a transmission mode supporting two transport blocks in at least one configured serving cell, $\tilde{o}^{ACK}_{4j+V_{C-DAI,c,m}^{DL}-1}$ = binary AND operation of the HARQ-ACK bits corresponding to the first and second codewords of this cell
$V_s = V_s \cup \{4j + V_{C-DAI,c,m}^{DL} - 1\}$
else $\tilde{o}^{ACK}_{4j+V_{C-DAI,c,m}^{DL}-1}$ = HARQ-ACK bit of this cell $V_s = V_s \cup \{4j + V_{C-DAI,c,m}^{DL} - 1\}$
end if
end if
c = c + 1
end while
m = m + 1
end while
if $V_{temp2} < V_{temp}$
   j = j + 1
end if
if the higher layer parameter spatialBundlingPUCCH is set FALSE and the UE is
configured with a transmission mode supporting two transport blocks in at least one
configured serving cell,
$O^{ACK} = 2 \cdot (4 \cdot j + V_{temp2})$
else -continued $O^{ACK} = 4 \cdot j + V_{temp2}$
$ô_i^{ACK}$ = NACK for any $i \in \{0, 1, \ldots, O^{ACK} - 1\} \backslash V_s$
if SPS PDSCH transmission is activated for a UE and the UE is configured to receive
SPS PDSCH in a subframe n − k where k ∈ K
$O^{ACK} = O^{ACK} + 1$
$o_{O^{ACK}-1}{}^{ACK}$ = HARQ-ACK bit associated with the SPS PDSCH transmission
end if Abbreviations used in the preceding description include:
3GPP Third Generation Partnership Project
BBU Baseband Unit
BTS Base Transceiver Station
CC Component Carrier
CQI Channel Quality Information
CSI Channel State Information
D2D Device to Device
DAI Downlink Assignment Index
DCI Downlink Control Information
DFT Discrete Fourier Transform
DMRS Demodulation Reference Signal
eNB eNodeB
FDD Frequency Division Duplex
FFT Fast Fourier Transform
FS Frame Structure
HARQ Hybrid Automatic Repeat Request
HTTP Hypertext Transfer Protocol
gNB Next-generation NodeB
LAA Licensed-Assisted Access
LBT Listen-before-talk
LTE Long Term Evolution
LTE-U LTE in Unlicensed Spectrum
M2M Machine to Machine
MIB Master Information Block
MIMO Multi-Input Multi-Output
MTC Machine Type Communication
NR New Radio
OFDM Orthogonal Frequency Division Multiplexing
PDSCH Physical Downlink Shared Channel
PUCCH Physical Uplink Control Channel
PUSCH Physical Uplink Shared Channel
RAN Radio Access Network
RAT Radio Access Technology
RBS Radio Base Station
RNC Radio Network Controller
RRC Radio Resource Control
RRH Remote Radio Head
RRU Remote Radio Unit
SCell Secondary Cell
SI System Information
SIB System Information Block
sPUCCH Short PUCCH
sPUSCH Short PUSCH
sPDCCH short Physical Downlink Control Channel
sTTI Short TTI
TCP Transmission Control Protocol
TDD Time Division Duplex
TTI Transmission Time Interval
UE User Equipment
UL Uplink
UTRAN Universal Terrestrial Radio Access Network
WAN Wireless Access Network

The invention claimed is:

1. A method for use in a network node of a frequency division duplex, FDD, wireless communication network, the method comprising,
scheduling, for a wireless device operating in the FDD wireless communication network, a first downlink transmission with a first transmission processing time on a first frequency carrier, the scheduling comprising a first downlink assignment index, DAI, the first DAI comprising a first total DAI and a first accumulative DAI;
scheduling, for the wireless device, a second downlink transmission with a second transmission processing time different than the first processing time on a second frequency carrier, the scheduling comprising a second DAI, the second DAI comprising a second total DAI and a second accumulative DAI, wherein the first transmission processing time and the second transmission processing time relate to a respective hybrid automatic repeat request, HARQ, feedback transmission timing corresponding to the first downlink transmission and the second downlink transmission, and wherein the network node expects HARQ feedback for the first downlink transmission and the second downlink transmission in a single uplink transmission; and
transmitting the scheduling for the first and second downlink transmission to the wireless device.

2. The method of claim 1, wherein the first downlink transmission is scheduled and transmitted to the wireless device at a first transmission time and the second downlink transmission is scheduled and transmitted to the wireless device at a second transmission time later than the first transmission time.

3. The method of claim 2, wherein:
the first transmission processing time is longer than the second transmission processing time;
the first total DAI is set to a total number of downlink transmissions with HARQ feedback expected in the single uplink transmission that are scheduled at the first transmission time;
the first accumulative DAI includes a number of downlink transmissions with HARQ feedback expected in the single uplink transmission that are previously scheduled at the first transmission time;
the second total DAI is set to a total number of downlink transmissions with HARQ feedback expected in the single uplink transmission that are scheduled at the first transmission time and the second transmission time; and
the second accumulative DAI includes a number of downlink transmissions with HARQ feedback expected in the single uplink transmission that are previously scheduled at the first transmission time and the second transmission time.

4. A method for use in a network node of a frequency division duplex, FDD, wireless communication network, the method comprising,
scheduling, for a wireless device operating in the FDD wireless communication network, a first downlink transmission with a first transmission duration on a first frequency carrier, the scheduling comprising a first downlink assignment index, DAI, the first DAI comprising a first total DAI and a first accumulative DAI;

scheduling for the wireless device, a second downlink transmission with a second transmission duration on a second frequency carrier, the scheduling comprising a second DAI, the second DAI comprising a second total DAI and a second accumulative DAI, and wherein the network node expects hybrid automatic repeat request, HARQ, feedback for the first downlink transmission and the second downlink transmission in a single uplink transmission on a third frequency carrier, and the uplink transmission has a third transmission duration different than at least one of the first and second transmission duration; and transmitting the scheduling for the first and second downlink transmission to the wireless device.

5. A network node configured to operate in a frequency division duplex, FDD, wireless communication network, the network node comprising processing circuitry configured to, schedule, for a wireless device operating in the FDD wireless communication network, a first downlink transmission with a first transmission processing time on a first frequency carrier, the scheduling comprising a first downlink assignment index, DAI, the first DAI comprising a first total DAI and a first accumulative DAI;

schedule, for the wireless device, a second downlink transmission with a second transmission processing time different than the first processing time on a second frequency carrier, the scheduling comprising a second DAI, the second DAI comprising a second total DAI and a second accumulative DAI, wherein the first transmission processing time and the second transmission processing time relate to a respective hybrid automatic repeat request, HARQ, feedback transmission timing corresponding to the first downlink transmission and the second downlink transmission, and wherein the network node expects HARQ feedback for the first downlink transmission and the second downlink transmission in a single uplink transmission; and transmit the scheduling for the first and second downlink transmission to the wireless device.

6. The network node of claim 5, wherein the first downlink transmission is scheduled and transmitted to the wireless device at a first transmission time and the second downlink transmission is scheduled and transmitted to the wireless device at a second transmission time later than the first transmission time.

7. The network node of claim 6, wherein:

the first transmission processing time is longer than the second transmission processing time;

the first total DAI is set to a total number of downlink transmissions with HARQ feedback expected in the single uplink transmission that are scheduled at the first transmission time;

the first accumulative DAI includes a number of downlink transmissions with HARQ feedback expected in the single uplink transmission that are previously scheduled at the first transmission time;

the second total DAI is set to a total number of downlink transmissions with HARQ feedback expected in the single uplink transmission that are scheduled at the first transmission time and the second transmission time; and the second accumulative DAI includes a number of downlink transmissions with HARQ feedback expected in the single uplink transmission that are previously scheduled at the first transmission time and the second transmission time.

8. A method for use in a user equipment of a frequency division duplex, FDD, wireless communication network, the method comprising, receiving scheduling in the FDD wireless communication network for a first downlink transmission with a first transmission processing time on a first frequency carrier, the scheduling comprising a first downlink assignment index, DAI, the first DAI comprising a first total DAI and a first accumulative DAI;

receiving scheduling in the FDD wireless communication network for a second downlink transmission with a second transmission processing time different than the first processing time on a second frequency carrier, wherein the first transmission processing time and the second transmission processing time relate to a respective hybrid automatic repeat request, HARQ, feedback transmission timing for the first downlink transmission and the second downlink transmission, the scheduling comprising a second DAI, the second DAI comprising a second total DAI and a second accumulative DAI;

receiving the first and second downlink transmissions; and transmitting HARQ feedback for the first downlink transmission and the second downlink transmission in a single uplink transmission.

9. The method of claim 8, wherein the first downlink transmission is scheduled and received by the user equipment at a first transmission time and the second downlink transmission is scheduled and received by the user equipment at a second transmission time later than the first transmission time.

10. The method of claim 9, wherein:

the first transmission processing time is longer than the second transmission processing time;

the first total DAI indicates a total number of downlink transmissions with HARQ feedback expected in the single uplink transmission that are scheduled at the first transmission time;

the first accumulative DAI includes a number of downlink transmissions with HARQ feedback expected in the single uplink transmission that are previously scheduled at the first transmission time;

the second total DAI indicates a total number of downlink transmissions with HARQ feedback expected in the single uplink transmission that are scheduled at the first transmission time and the second transmission time; and the second accumulative DAI includes a number of downlink transmissions with HARQ feedback expected in the single uplink transmission that are previously scheduled at the first transmission time and the second transmission time.

11. A user equipment configured to operate in a frequency division duplex, FDD, wireless communication network, the user equipment comprising processing circuitry configured to, receive scheduling in the FDD wireless communication network for a first downlink transmission with a first transmission processing time on a first frequency carrier, the scheduling comprising a first downlink assignment index, DAI, the first DAI comprising a first total DAI and a first accumulative DAI;

receive scheduling in the FDD wireless communication network for a second downlink transmission with a second transmission processing time different than the first processing time on a second frequency carrier, wherein the first transmission processing time and the second transmission processing time relate to a respective hybrid automatic repeat request, HARQ, feedback transmission timing corresponding to the first downlink transmission and the second downlink transmission, and the scheduling comprising a second DAI, the second DAI comprising a second total DAI and a second accumulative DAI;

receive the first and second downlink transmissions; and transmit HARQ feedback for the first downlink transmission and the second downlink transmission in a single uplink transmission.

12. The user equipment of claim 11, wherein the first downlink transmission is scheduled and received by the user equipment at a first transmission time and the second downlink transmission is scheduled and received by the user equipment at a second transmission time later than the first transmission time.

13. The user equipment of claim 11, wherein:
the first transmission processing time is longer than the second transmission processing time;
the first total DAI indicates a total number of downlink transmissions with HARQ feedback expected in the single uplink transmission that are scheduled at the first transmission time;
the first accumulative DAI includes a number of downlink transmissions with HARQ feedback expected in the single uplink transmission that are previously scheduled at the first transmission time;
the second total DAI indicates a total number of downlink transmissions with HARQ feedback expected in the single uplink transmission that are scheduled at the first transmission time and the second transmission time; and
the second accumulative DAI includes a number of downlink transmissions with HARQ feedback expected in the single uplink transmission that are previously scheduled at the first transmission time and the second transmission time.

14. A user equipment configured to operate in a frequency division duplex, FDD, wireless communication network, the user equipment comprising processing circuitry configured to,
receive scheduling in the FDD wireless communication network for a first downlink transmission with a first transmission duration on a first frequency carrier, the scheduling comprising a first downlink assignment index, DAI, the first DAI comprising a first total DAI and a first accumulative DAI;
receive scheduling in the FDD wireless communication network for a second downlink transmission with a second transmission duration on a second frequency carrier, the scheduling comprising a second DAI, the second DAI comprising a second total DAI and a second accumulative DAI;
receive the first and second downlink transmissions; and
transmit hybrid automatic repeat request, HARQ, feedback for the first downlink transmission and the second downlink transmission in a single uplink transmission, wherein the uplink transmission has a third transmission duration different than at least one of the first and second transmission durations.

15. The user equipment of claim 14, wherein the first downlink transmission is scheduled and received by the user equipment at a first transmission time and the second downlink transmission is scheduled and received by the user equipment at a second transmission time later than the first transmission time.

16. The user equipment of claim 14, wherein the first transmission duration is the same as the second transmission duration, and the first transmission duration and the second transmission duration are shorter than the third transmission duration.

17. The user equipment of claim 16, wherein:
the first total DAI indicates a total number of downlink transmissions with HARQ feedback expected in the single uplink transmission that are scheduled at the first transmission time;
the first accumulative DAI includes a number of downlink transmissions with HARQ feedback expected in the single uplink transmission that are previously scheduled at the first transmission time;
the second total DAI indicates a total number of downlink transmissions with HARQ feedback expected in the single uplink transmission that are scheduled at the first transmission time and the second transmission time; and
the second accumulative DAI includes a number of downlink transmissions with HARQ feedback expected in the single uplink transmission that are previously scheduled at the first transmission time and the second transmission time.

* * * * *

UNITED STATES PATENT AND TRADEMARK OFFICE
CERTIFICATE OF CORRECTION

PATENT NO. : 11,894,933 B2
APPLICATION NO. : 16/632800
DATED : February 6, 2024
INVENTOR(S) : Falconetti et al.

Page 1 of 2

It is certified that error appears in the above-identified patent and that said Letters Patent is hereby corrected as shown below:

On the Title Page

In Item (72), under "Inventors", in Column 1, Line 2, delete "Årstá" and insert -- Årsta --, therefor.

In the Drawings

In Fig. 12, Sheet 11 of 14, for Tag "1216", in Line 1, delete "scheduling" and insert -- scheduling for --, therefor.

In the Specification

In Column 1, Line 31, delete "such" and insert -- such as --, therefor.

In Column 1, Line 61, delete "$N^{RB}_{sc}=12$),"  and insert -- $N_{sc}^{RB}=12$), --, therefor.

In Column 2, Line 62, delete "to refer" and insert -- refer --, therefor.

In Column 3, Line 59, delete "SC FDMA" and insert -- SC-FDMA --, therefor.

In Column 5, Lines 44-45, delete "Physical Uplink Shared Data Channel" and insert -- Physical Uplink Shared Channel --, therefor.

In Column 6, Line 6, delete "cdebooksizeDetermination-" and insert -- codebooksizeDetermination- --, therefor.

In Column 6, Line 44, delete "DA," and insert -- DAI, --, therefor.

In Column 11, Line 38, delete "and may" and insert -- may --, therefor.

In Column 14, Line 40, delete "is flow" and insert -- is a flow --, therefor.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,894,933 B2

In Column 19, Line 62, delete "DA." and insert -- DAI. --, therefor.

In Column 20, Line 49, delete "DAT" and insert -- DAI --, therefor.

In Column 20, Line 50, delete "DAT" and insert -- DAI --, therefor.

In Column 20, Line 54, delete "DAT" and insert -- DAI --, therefor.

In Column 20, Line 57, delete "DAT" and insert -- DAI --, therefor.

In Column 20, Line 59, delete "DAT" and insert -- DAI --, therefor.

In Column 27, Line 51, delete "and/or or" and insert -- and/or --, therefor.

In Column 29, Line 44, delete "multi-standard radio (MSR) radio" and insert -- multi-standard radio (MSR) --, therefor.

In Column 29, Line 61, delete "equipped" and insert -- equipment --, therefor.

In Column 30, Line 16, delete "sPDSCH. sPUCCH." and insert -- sPDSCH, sPUCCH, --, therefor.

In Column 30, Line 40, delete "Li" and insert -- L1 --, therefor.

In the Claims

In Column 40, Line 55, delete "aspects" and insert -- aspects of --, therefor.